United States Patent
Muthiah et al.

(10) Patent No.: US 7,487,321 B2
(45) Date of Patent: *Feb. 3, 2009

(54) METHOD AND SYSTEM FOR MEMORY LEAK DETECTION

(75) Inventors: Manikam Muthiah, Dindigul (IN); Chandra Sekhar Putha, Thiruvanmiyur (IN); Jun Xu, Cupertino, CA (US); Xiangrong Wang, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/058,585

(22) Filed: Feb. 15, 2005

(65) Prior Publication Data
US 2005/0235127 A1 Oct. 20, 2005

Related U.S. Application Data

(63) Continuation-in-part of application No. 10/827,048, filed on Apr. 19, 2004, now Pat. No. 7,293,142.

(51) Int. Cl.
*G06F 12/00* (2006.01)

(52) U.S. Cl. .............. 711/170; 707/205; 707/206; 717/124; 717/127; 718/104; 711/124

(58) Field of Classification Search ........... 711/170, 711/124; 717/124, 127; 707/205, 206; 718/104
See application file for complete search history.

(56) References Cited

U.S. PATENT DOCUMENTS

| | | | |
|---|---|---|---|
| 5,590,329 A | 12/1996 | Goodnow, II et al. | |
| 5,689,707 A | 11/1997 | Donnelly | |
| 5,842,019 A * | 11/1998 | Kolawa et al. | ............. 717/130 |
| 5,911,073 A | 6/1999 | Mattson, Jr. et al. | |
| 5,953,530 A | 9/1999 | Rishi et al. | |
| 6,154,128 A | 11/2000 | Wookey et al. | |
| 6,182,249 B1 | 1/2001 | Wookey et al. | |
| 6,237,114 B1 | 5/2001 | Wookey et al. | |
| 6,523,141 B1 * | 2/2003 | Cantrill | ..................... 714/48 |
| 6,560,773 B1 | 5/2003 | Alexander, III et al. | |
| 6,658,652 B1 | 12/2003 | Alexander, III et al. | |
| 6,718,485 B1 * | 4/2004 | Reiser | ..................... 714/38 |
| 6,892,378 B2 * | 5/2005 | Curtis et al. | ............... 717/127 |
| 2004/0221120 A1 * | 11/2004 | Abrashkevich et al. | ...... 711/170 |
| 2005/0114843 A1 * | 5/2005 | Gilgen et al. | ............... 717/127 |
| 2005/0114844 A1 * | 5/2005 | Betancourt et al. | .......... 717/128 |

(Continued)

OTHER PUBLICATIONS

Preiss, Bruno. "Mark-and-Sweep Garbage Collection" 1998. retrieved from http://brpriess.com/books/opus5/html/page424.html on May 2, 2007.*

(Continued)

*Primary Examiner*—Hong Kim
(74) *Attorney, Agent, or Firm*—Trellis IP Law Group, PC

(57) ABSTRACT

Systems, methods, apparatus and software can be implemented to detect memory leaks with relatively high confidence. By analyzing memory blocks stored in a memory, implicit and/or explicit contingency chains can be obtained. Analysis of these contingency chains identifies potential memory leaks, and subsequent successive verification confirms whether the potential memory leaks are memory leaks.

64 Claims, 16 Drawing Sheets

U.S. PATENT DOCUMENTS

2005/0240747 A1* 10/2005 Raut .......................... 711/170
2005/0289307 A1* 12/2005 Achanta et al. ............. 711/159

OTHER PUBLICATIONS

"The Authoritative Dictionary of IEEE Standards Terms." 7th Ed. 2000. IEEE Press. pp. 583.*

Linux Journal, Author: Cal Erickson. "Memory Leak Detection in Embedded System—Topic: Embedded", Sep. 1, 2002, 5 pages.

Linux Journal, Author: Cal Erickson, "Memory Leak Detection C++—Topic: Embedded", Jun 1, 2003. 5 pages.

Oxford University Press, Author: Michael J. Kahana, Edited by Endel Tulving and Fergus I. M. Cralk, "Contingency Analyses of Memory", 2002, 15 pages.

* cited by examiner

| Index | Content (Contingencies) |
|---|---|
| Block 0xABCD | null |
| Block 0x1234 | 0xABCD, 0xBCDE |
| Block 0x5678 | 0xABCD |
| Block 0xBCDE | root |
| Block 0x89AB | 0xBCDE |

METHOD AND SYSTEM FOR MEMORY LEAK DETECTION

This is a continuation-in-part patent application of U.S. Pat. No. 7,293,142, issued on Nov. 6, 2007. Benefit of the earlier filing date is claimed for all common subject matter.

BACKGROUND OF THE INVENTION

1. Field of Invention

The present invention relates to testing of hardware and software, and particularly to the detection and identification of memory leaks in software.

2. Description of the Background Art

In any computing system, including general purpose computer systems and embedded systems, resource management generally and memory management in particular are very important to proper system operation. In any computing system, memory management typically occurs at several levels, e.g., hardware memory management, operating system (OS) memory management, and application memory management. OS and application memory management rely on various software techniques for allocation and deallocation of memory used by the system. In the OS, memory is allocated to user programs, and reused by other programs when it is no longer required. Application memory management typically involves supplying the memory needed for a program's objects and data structures from the limited resources available, and recycling that memory for reuse when it is no longer required.

In general, as memory allocation techniques have become more sophisticated, the nature of memory allocation errors has become more complex. For example, with static allocation (used in many early systems and in languages such as Fortran) all data structure names are bound to storage locations at compile-time and the bindings do not change at runtime. Although static allocation imposes significant limits on program flexibility, it reduces the complexity associated with debugging memory allocation errors. Various forms of dynamic memory allocation, both for stack memory and heap memory are more commonly used today. However, to support dynamic allocation, OS's and application programs utilize additional code to handle their changing memory requirements because they cannot in general predict in advance how much memory they are going to require. For example, when a program requests a block of memory, a memory manager will allocate that block out of the larger blocks it has received from the operating system. This allocation is performed by some combination of OS or kernel level memory management software and memory management software associated with the application itself, e.g., allocation and deallocation functions such as the C functions malloc( ) and free( ).

One common form of memory allocation error is a memory leak, which can be a major resource issue leading to many system malfunctions and negative performance impacts. In general, a memory leak occurs when allocated memory is not freed after use, or when a needed reference to that allocated memory, e.g., a pointer to the memory allocation, is deleted thereby rendering the memory no longer reachable or "live" to the system. Memory leaks can take many forms, e.g. occurring in contiguous block or fragmentally, and can occur in a variety of different memory systems such as flattened memory architectures or those with virtual memory spaces. Reckless use of dynamic memory allocation can lead to memory management problems, which cause performance degradation, unpredictable execution or crashes.

Various tools currently exist to detect memory leaks. These tools typically work by replacing generic memory functions in the library, such as malloc( ) and free( ), and other memory calls with specialized functions designed to track and account for memory allocation. Each tool typically has code that intercepts calls to traditional memory functions during program execution and sets up logging information for each memory allocation/de-allocation request. Some tools can further implement memory protection fences to catch illegal memory accesses. In still other examples, the policing of memory allocation and de-allocation is performed by specialized programs generally referred to as garbage collectors.

Unfortunately, all of these techniques used to analyze software memory require source code instrumentation adding to the size and complexity of the source code. Moreover, such code instrumentation typically degrades program performance. In some cases, e.g., embedded systems, the impact may be so significant that it makes the program unusable in its planned environment. Further, the techniques used by leak detection programs to reduce false alarms may require that the target application have Virtual Memory (VM) hardware. The running of these programs relies on the presence of VM hardware, but many embedded and real time systems do not have these capabilities. Further, some techniques are based on Stop-and-Run/Incremental Garbage Collection to help debug normal application programs that run in an OS. However, the techniques require to pause the application programs. Many of the tools also present numerous "false positives," that is they identify circumstances as memory leaks which are not in fact memory leaks.

Accordingly, it is desirable to have memory leak detection and analysis tools and methods that are compact, are less intrusive, pose low performance impact, are efficient, and present a low rate of false-positive results.

DETAILED DESCRIPTION OF EMBODIMENTS OF THE INVENTION

Figure 1:
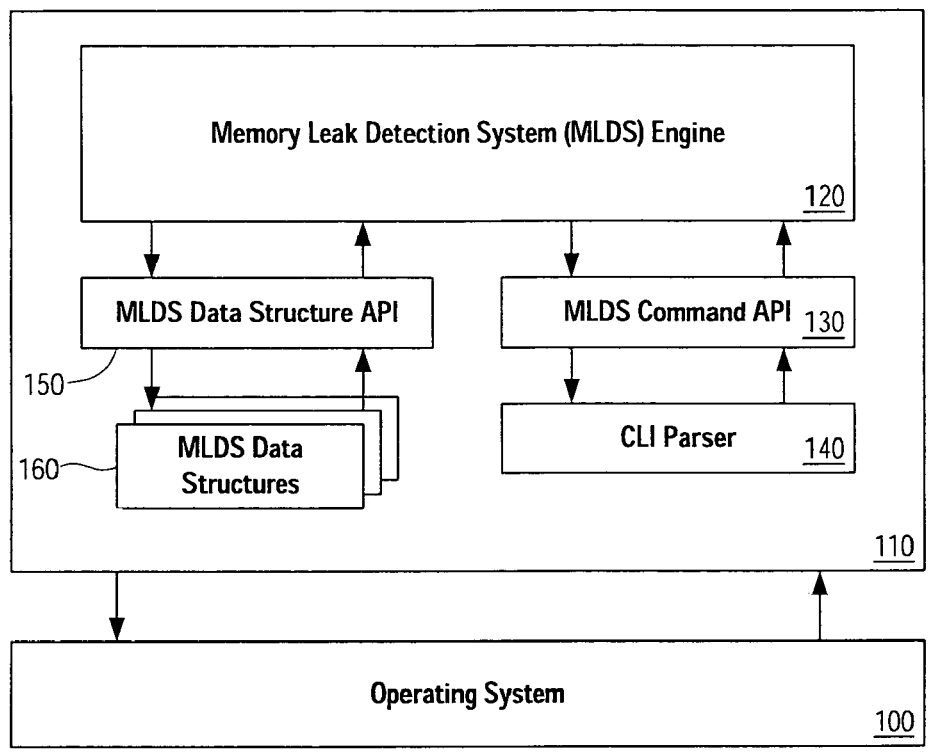
FIG. 1 is a simplified block diagram of a memory leak detection system.

The following sets forth a detailed description of at least the best contemplated mode for carrying out the one or more devices and/or processes described herein. The description is intended to be illustrative and should not be taken to be limiting.

Although there are a number of techniques for identifying potential memory leaks, existing memory leak detection algorithms do not adequately distinguish between actual memory leaks and other conditions. In order to both improve memory leak detection systems, both directly by improving the algorithms and indirectly by improving the manner in which the algorithms are adjusted or "fine-tuned", certain neuroscience concepts and principles have been applied to memory leak detection. In particular, the present application takes advantage of concepts described by Michael Kahana in "Contingency Analyses of Memory," pp. 59-72, The Oxford Handbook of Memory, Oxford University Press, 2000, which is hereby incorporated herein by reference in its entirety.

In general, the contingency analysis described by Kahana is used to assess the relationship between the results from different types of tests of human memory. One goal of the analysis is to determine if the memory mechanisms targeted by the different types of tests share certain features or are instead more likely to be unrelated. As demonstrated by Kahana, contingency analysis techniques can used to select among various memory tests to isolate those tests that are more likely targeting the same mechanism or mechanisms. In so doing, contingency analysis can lead to the selection, modification, and use of the testing techniques most suited for determining a particular memory related characteristic. Additionally, contingency analysis of human memory suggests certain types of tests to be performed when analyzing non-human memory.

For example, Kahana examines a number of tests of successive memory tasks including item recognition, cued recall, tests of episodic memory using identical cues, and tests of episodic memory using cues containing identical information. Kahana shows that successive tests of episodic memory with identical cues or cues containing identical information demonstrate very high dependencies using the Yule's Q measure of correlation (described below). Thus, by applying contingency analyses to the relationship between recognition and recall, researchers have shown that experimental variables that have a significant effect on overall levels of performance do not seem to affect the task-to-task contingencies. Although Kahana's analysis is aimed at gaining insight into human memory, similar principles can be applied to computer memory for both detecting possible memory leaks and assessing the level of confidence in a particular possible memory leak.

To illustrate the use of contingency analysis, Kahana describes examining the relationship between recognition and recall at the level of individual subject items. Subjects study pairs of items (A-B) and are then given two successive tests: an item recognition test followed by a cued recall test. In the recognition test, an experimenter present B items from the studied pairs intermixed with non-studied items (lures). Subjects judge each item as a target or a lure. In cued-recall tests, subjects attempt to recall the B items given the A items as cues. Because the results cannot be averaged over subjects or items, a contingency table is computed. The table below illustrates an example of such a contingency table:

|        |   | Test 1 |   |
|--------|---|--------|---|
|        |   | 1      | 0 |
| Test 2 | 1 | A      | B |
|        | 0 | C      | D |

Because the test outcomes are binary variables (1=yes, and 0=no), subject-item correlation can be computed between test 1 (e.g., the recognition test) and test 2 (e.g., the recall test) by tabulating the data in the contingency table. Each of the values A-D represents the tally of results for that category.

Yule's Q is a common measure of correlation for 2×2 contingency tables, and is calculated by evaluating $Q=(AD-BC)/(AD+BC)$. The value Q can range from −1 (perfect negative correlation) to +1 (perfect positive correlation). Thus, Yule's Q is used to study agreement among ratings of multiple statistical parameters, experts, diagnostic tests, etc. Intuitively, it shows the relative increase in the odds of one test leading to a certain result, given that the other test yielded the same result. The value is invariant regardless of whether one is concerned with positive or negative rating, or which test is the reference. While such analysis may not provide direct information about the underlying mechanisms tested by each test, it does provide some information about the probability that two test are testing related mechanisms, assuming that the mechanisms have the same effect on both tests. Although Yule's Q is the example illustrated here, one having ordinary skill in the art will readily recognize that a variety of different correlational measures can be used in contingency analysis.

To apply these techniques to the problem of memory leak detection, certain parallels should be identified. Kahana's analysis is based on using memory cues and the level of recognition and recall to determine, among other things, the likelihood that the two tests are testing for the same (or a similar) underlying mechanism. In the case of memory leak detection, two different tests can be employed to determine if a particular memory block represents a leak. Contingency analysis can be used to help determine: (1) which tests among all the possible tests are best suited to be used together, and (2) in some specific cases, a confidence level in the determination based on the two tests.

In the case of computer memories, there are many objects that can possibly have several associated dependencies. For example, if the object is a pointer to a memory block, the pointer has dependencies such as: other pointers/addresses, global variables that store the value of the pointer, etc. The dependencies collectively form the contingency, that is a dependency relationship, among objects.

In more specific examples, one can examine the manner in which memory is managed in a particular OS. In the present application, examples will emphasize use of Cisco IOS software. Many line cards, network switches, switch-routers, routers, router-switches and storage network devices produced by Cisco Systems, Inc., operate using Cisco IOS software. Cisco IOS software is system software that provides common functionality, scalability, and security for a variety of devices, and allows centralized, integrated, and automated installation and management of internetworks while ensuring support for a wide variety of protocols, media, services, and platforms. The IOS represents an operating system used by embedded systems, in contrast to operating systems like Unix, Linux, and Windows which are more commonly (although not exclusively) used in general purpose computer systems such as PCs, workstations, and servers. Thus, although many of the examples disclosed in this application emphasize embedded applications generally, and use in the IOS environment in particular, those of ordinary skill in the art will readily recognize that the systems, methods, and software described herein can generally be used with any type of computing system.

A variety of different elements used in IOS memory management can serve as cues. Examples include the bit patterns of specific pointers such as the address values associated with malloc( ) function calls used to allocate specific blocks of memory, the variation of address values (e.g., offset, range) of the various memory blocks, and other blocks from other OS memory data structures (e.g., a "chunk" which is a memory block which organizes its own elements for fast and small memory requests). Still other elements used in IOS memory can serve to measure the level of recall. One example in IOS is the correlation of a block in use with the cue's value, where, for example, the cue values are stored in a BSS area of memory (as described below). Other IOS memory management elements can serve to measure the level of recognition. For example, the validity of a memory block can be measured against its existence in IOS memory management lists. In general, maximizing the levels of recognition and recall provide higher memory leak detection yields, i.e., less false-positive outcomes. As will be described in greater detail below, both software successive memory tasks analysis and successive memory tests of episodic memory with identical cues or cues containing identification can be used to identify memory leaks. In general, the former technique is used when the number of memory blocks being allocated is relatively small (e.g., on the order of 10,000 in a typical IOS implementation), and thus the analysis time will not be severely impacted. The latter technique can be used when the number of memory blocks being allocated exceeds a user's allowed time threshold.

FIG. 1 is a simplified block diagram of a memory leak detection system. Memory leak detection system (MLDS) 110 typically operates in conjunction with a devices operating system 100, e.g., it utilizes memory management services provided by the OS, but can be integrated into the OS in some implementations. At the heart of MLDS 110 is the MLDS Engine 120. MLDS Engine 120 interfaces with several application programming interfaces (APIs) (MLDS data structure API 150 and MLDS command API 130) as well as with operating system 100. In general, MLDS Engine 110 fulfills a number of tasks to implement and support various memory leak detection algorithms. For example, MLDS 110 handles requests from command line interface (CLI) parser 140, provides memory leak reports to users, initialized and updates MLDS data structures 160, and performs leak detection in designated memory areas with reduced impact on system operation.

As noted above, the Cisco IOS provides an example of an OS such as OS 100. Such OSs typically provide services and functionality for process scheduling and management, memory management, and CPU and physical memory resource management. Moreover, OS 100 can support device drivers interfacing processes, the OS kernel, and various hardware elements. Because the environment in which OS 100 and MLDS 110 operate typically imposes a variety of resource restrictions, e.g., an embedded or real-time environment, MLDS 110 is preferably designed to minimize the impact on CPU and memory resources. In one embodiment, MLDS 110 is designed to not interfere with the normal operations (e.g., network operations such as packet routing, packet forwarding, etc.) of the device. To accomplish this, MLDS 110 can be configured to follow a number of guidelines such as: yield to the CPU as often as possible; choose a relatively low process priority level at which to operate; reduce CPU expensive tasks; eliminate tasks which bring little value; preempt tasks when the analysis could lead to conclusion, and the like. Moreover, in some embodiments, MLDS 110 has full usage of the kernel memory management information and access privilege of any allocated memory block's contents, normally via kernel functions. If the kernel does not already provide this information, then the tool typically needs to provide the additional functionality to retrieve the block and pointer information.

MLDS data structures 160 can be used to store report information, track information on leaked memory blocks, and track information on other memory related statistics, e.g., allocation statistics. Example data structures include: (1) memory type (enum)—this indicates the memory type under analysis because different memory types (heap memory vs. buffer memory) generally need different handling; (2) dynamic memory information—this data structure holds memory information from the time the MLDS was invoked to the current memory usage information; (3) leaked memory information—this data structure holds information about leaked memory blocks; and (4) memory allocation address—this data structure holds the address of the memory allocated from each instance of an allocation function. Numerous other data structures can be implemented and will generally be understood by those having ordinary skill in the art.

CLI Parser 140 allows a user to issue commands to control the memory leak detection and analysis through, for example, a console connection or a telnet session. Commands implemented via CLI parser 140 and MLDS command API 130 include are designed for activating MLDS 110, monitoring and maintaining MLDS 110, and in some cases debugging MLDS 110. For example, commands can be implemented to enable/restart memory leak detection and clear all previous records, disable memory leak detection, display the previous memory leak report if any, provide additional memory allocation information such as allocation counts for each program counter, and provide on demand analysis of the memory leak with latest memory usage and update MLDS data structures 160. Numerous other commands can be implemented and will generally be understood by those having ordinary skill in the art. Although the system and commands illustrated are generally designed to provide on-demand memory leak analysis via CLI, other types of analysis such as event-triggered analysis and scheduled analysis can also be implemented.

Since the goal of the MLDS is to help users identify memory leaks, it is important for MLDS 110 to be able to provide adequate information about memory leaks (and memory usage in general). To that end, MLDS 110 can be designed to provide a variety of different information depending on configuration and/or the specified type of report. The following is a non-exclusive list of the types of information that can be provided by MLDS 110 in association with its operation: caller program counter—address of the system call that allocated the memory block in question; caller name/ID—the name or identification of the process that owns the memory block; icount—the initial block count when MLDS is enabled (this number typically remains constant until MLDS 110 is reset) from each caller program counter; pcount—the previous block count from the last time that a leak detection command was invoked; Icount—the current block count reported during current MLDS analysis; linearity—a reference number that reflects the history (e.g., variation trend) of allocated block numbers; leaked block—the hexadecimal value of a leaked memory block. Using this or other reported information, a user can determine the source of the memory leak, or at least the function/code line that allocated the memory block that ultimately became a memory leak.

In most instances, memory leaks are detectable after the first invocation of MLDS 110. In other instances, it may be necessary, or desirable to invoke the MLDS multiple times and compare results. Thus, a user might establish certain test conditions for the device/program being tested, run MLDS 110, change or re-establish test conditions, re-run MLDS 110, etc.

The information reported by MLDS 110 depends in large part on the memory-related information accessible to the system. Such memory-related information includes, for example, memory management data from OS 100 and memory-related information stored in each block. In one embodiment, each allocated memory block includes, in addition to a user data area, certain header information about the block itself, related blocks, and the circumstances under which the block was allocated. Such header information can include: the block's address (e.g., a pointer value); the process ID/name of the process that caused the block's allocation; the program counter value corresponding to that allocation function invocation; a pointer to the next block in a chain of allocated blocks; a pointer to a previous block in a chain of allocated blocks; block size information; reference count information, and even de-allocation information. Moreover, upon identifying a leaked block, MLDS 110 can use and display some or all of this information, including the complete contents of the leaked memory block.

In the implementation illustrated, all CLI commands access MLDS engine 120 via MLDS command API 130, so that there is no need to access the MLDS data structures from CLI. In other implementations, API functionality can be eliminated or integrated into MLDS engine 120. However, the use of such APIs generally provides greater flexibility and scalability for the memory leak detection system. Moreover, although the various components of MLDS 110 have been shown as separate entities, some or all of them can be combined in various ways as is well known to those having ordinary skill in the art.

Figure 2:
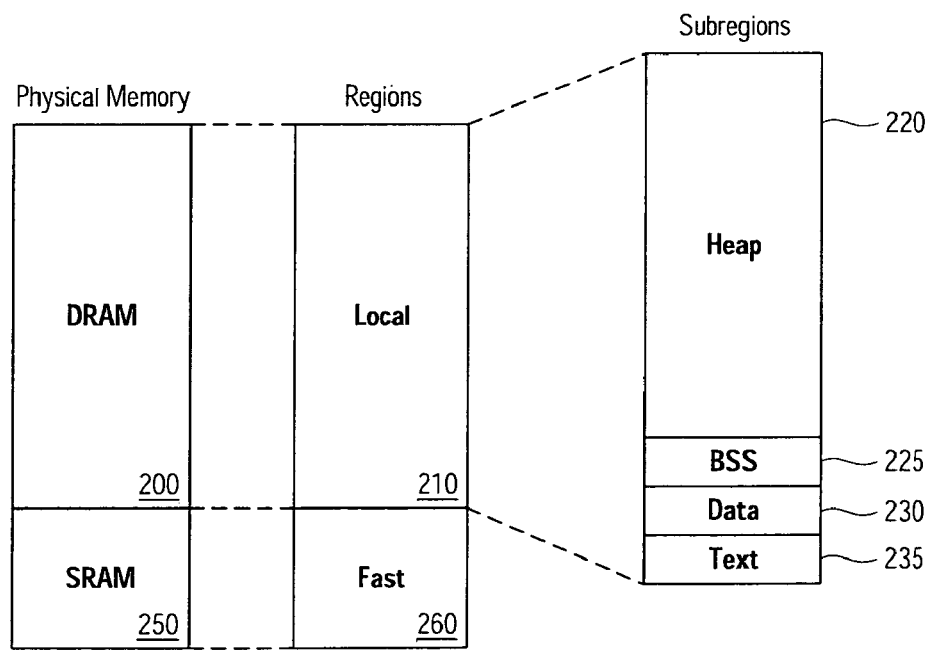
FIG. 2 is a simplified block diagram illustrating an example of memory organization in a device that uses a memory leak detection system.

FIG. 2 is a simplified block diagram illustrating an example of memory organization in a device that uses MLDS 110. Again, the example of FIG. 2 is modeled after an embedded implementation of the Cisco IOS. In this example, the entire physical memory is mapped into one large flat virtual address space. No memory paging of swapping is performed, so this example does not illustrate a full virtual memory scheme. The address space is divided into areas of memory called regions which generally correspond to the various physical memories such as DRAM 200 and SRAM 250. Thus, local region 210 corresponds to DRAM 200 and fast region 260 corresponds to SRAM 250. Different types of physical memory might be present in the system because they are particularly suited for certain tasks. For example, SRAM 250 might be present for storing packets in a router, while DRAM 200 might be present for storing software and operational data. While the local region is typically used for normal run-time data structures and local heaps, other regions can serve more specialized purposes: fast (260)—associated with fast memory such as SRAM 250 and used for special purpose or speed-critical storage; iomem (not shown)—shared memory that is visible to both the CPU and other controllers over a data bus; itext (not shown)—executable OS code; and idata (not shown)—initialized variables; ibss (not shown)—uninitialized variables. Still other regions can be defined.

FIG. 2 also illustrates subregions 220-235. Subregions 220-235 provide a further level of flexibility in organizing and protecting memory. In general, classifying memory into regions and subregions allows the IOS to group various types of memory so software need not know about the specifics of memory on every platform. IOS manages available free memory via one or more memory pools, which are essentially heaps in the generic sense. Each pool is a collection of memory blocks that can be allocated and deallocated as needed. Memory pools are built from one or more regions or subregions and are managed by memory management functionality of the kernel. In many instances, pools have a one-to-one correspondence with regions or subregions. So, for example, heap 220 can correspond to a single memory pool from which memory blocks are allocated and deallocated. In managing the memory blocks in a pool, the memory manager typically maintains list of available memory blocks. As processes request memory, the memory manager allocates memory from the list. As memory blocks are freed by processes, the area becomes available again and is added back to the list of available blocks. While in many implementations, a single memory manager operates to control all memory related functions for the kernel, in this example there are typically separate memory managers for managing regions/subregions and memory pools. Again, it should be noted that the memory scheme illustrated in FIG. 2 is merely illustrative and a number of different methods for memory organization and management can utilize the memory leak detections systems and methods described in the present application.

Because there are typically several different areas of memory, which may or may not correspond to different types of memory, in a computing system, MLDS 110 is generally designed to search for memory leaks in different memory areas. For example, in one embodiment, MLDS 110 searches for memory leaks in two different IOS memory management areas, the memory managed under the memory pool manager and a buffer area (used for storing data packets handled by routers, etc.) under a buffer manager. Although the discussion of memory leak detection below will generally focus on analyzing the memory in the heap under the memory pool manager, it should be understood that the techniques described can be extended to other types of memory and/or other regions/subregions/pools of memory.

Figure 3:
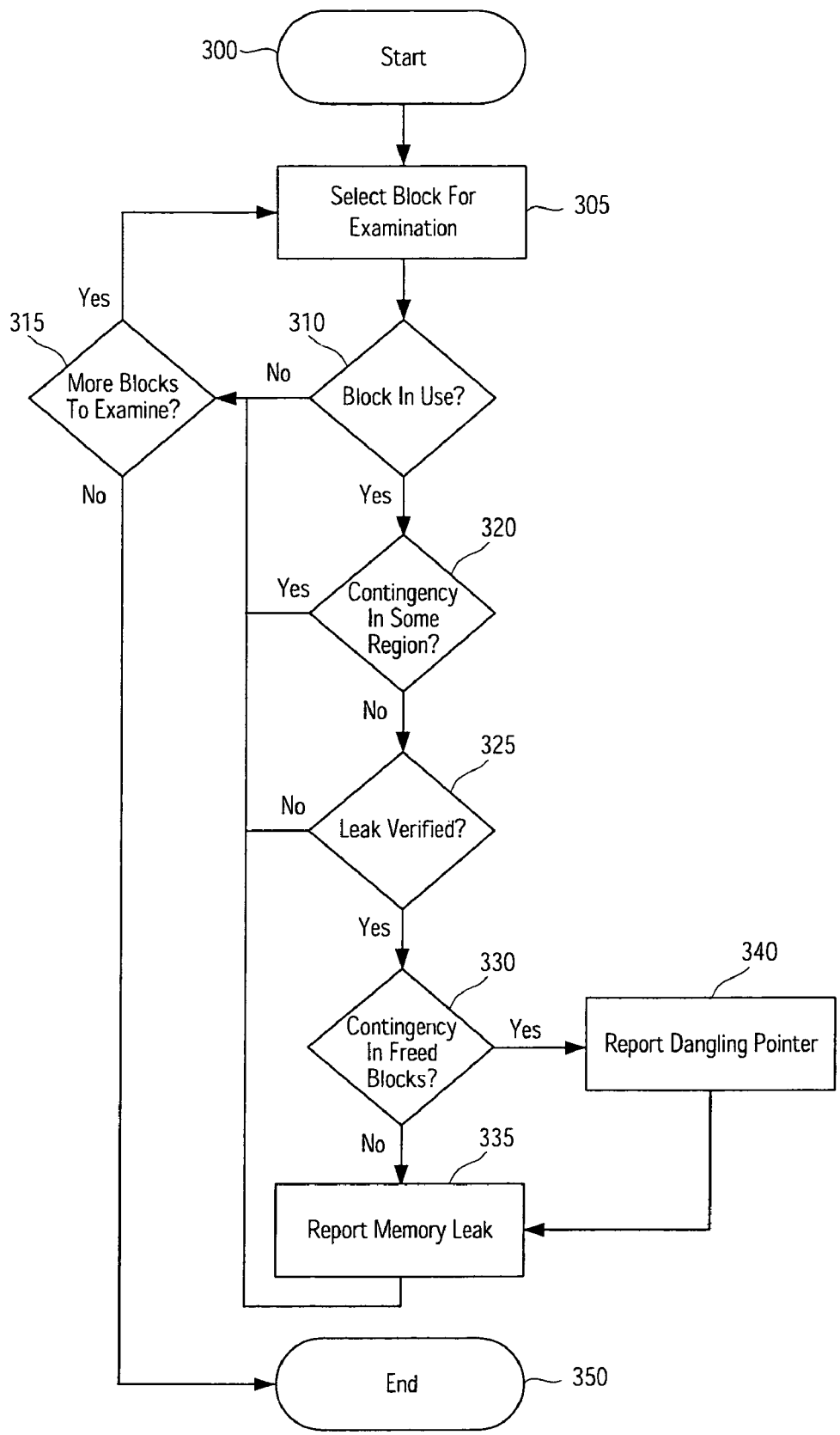
FIG. 3 is a flow chart illustrating techniques of the present invention.
Figure 4:
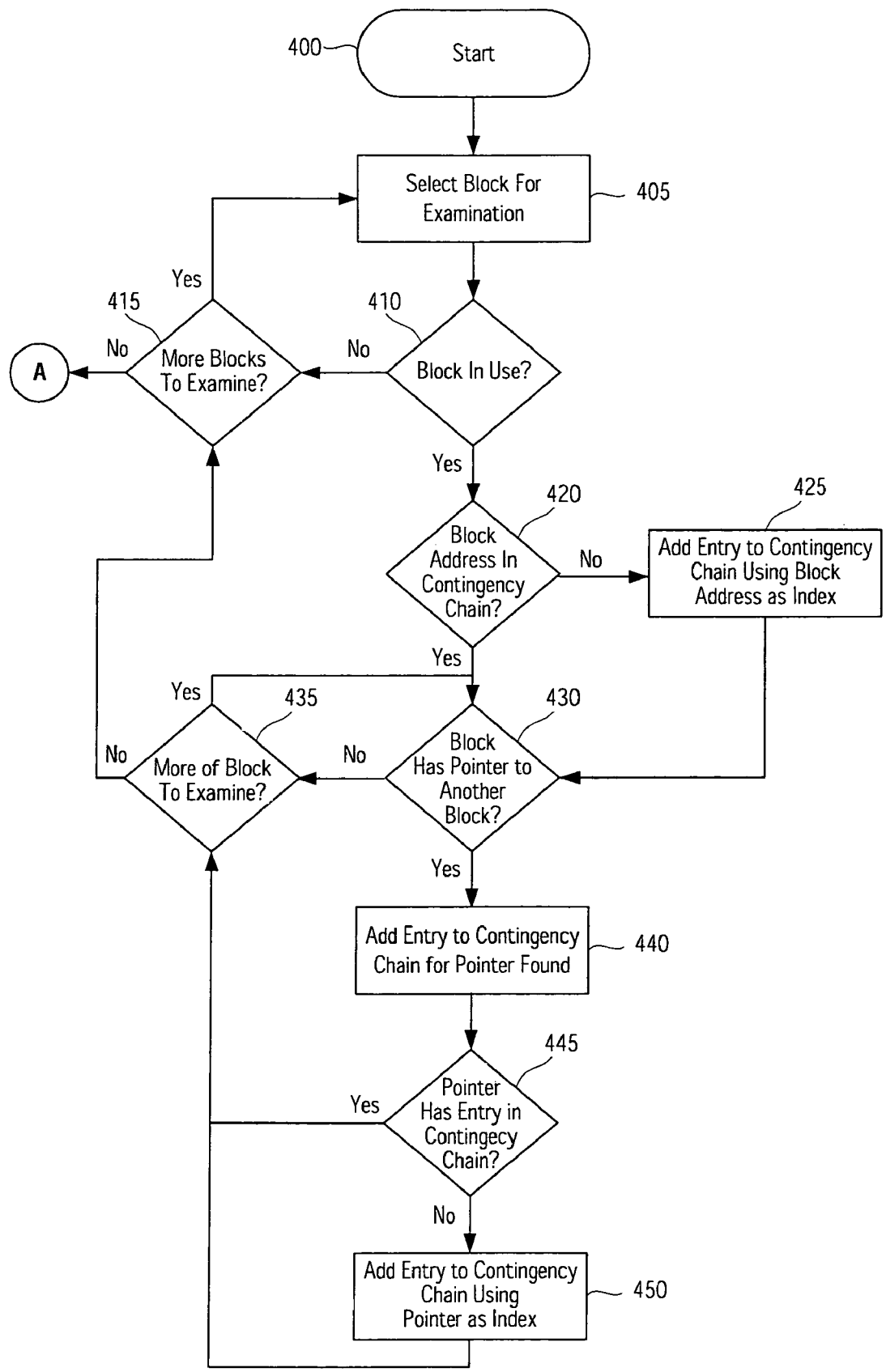
FIG. 4 is a flow chart illustrating techniques of the present invention.
Figure 5:
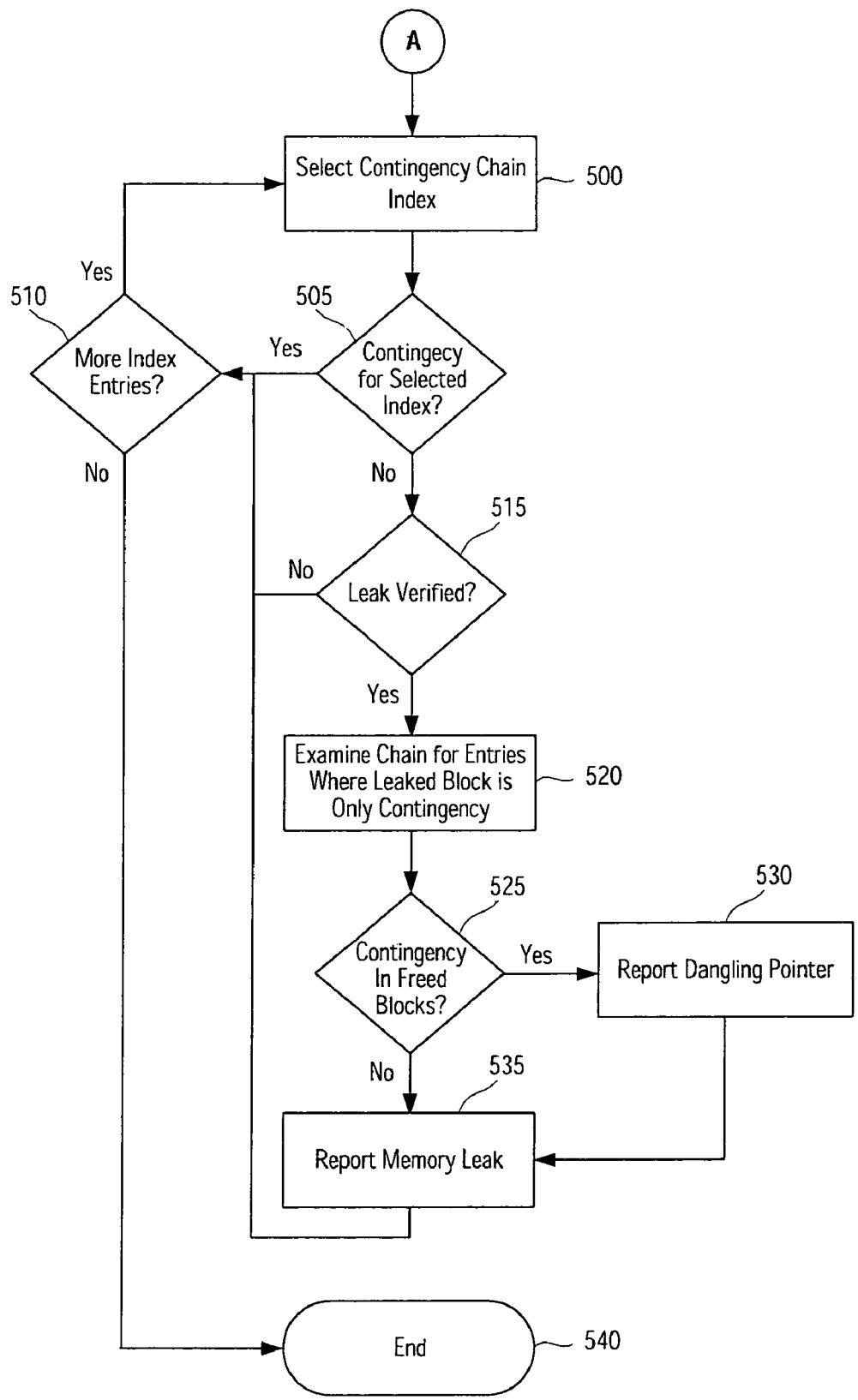
FIG. 5 is a flow chart illustrating techniques of the present invention.

FIG. 3 to FIG. 5 are flow charts illustrating various memory leak detection techniques that are used by memory leak detection systems such as MLDS 110. In general, a memory leak (leakage) remains unclaimed and unchanged, i.e. the allocated memory is not released, by any other processes or system activities after the parent process terminates or configuration changes regardless of time and system conditions. The leakage occurs during memory dynamic operations, but from the kernel's memory management point of view, the leaked block is no different from other normal memory blocks in use. In order to detect memory leaks, the algorithms described below generally assume that: a leak is always a leak, i.e. it cannot be freed by any process at any time; no process is using a leaked block; and from the system point of view, a leaked block is still valid. Thus, even though the memory usage is volatile in an active system, the leaked memory blocks will remain in the leaked state from, for example, the time when one or more references to the block become lost. From the above assumptions, snapshots of a system's memory map would be considered as containing full status information for all leaked blocks contained in the system, so the following algorithms can apply to scan such a memory snapshot.

All allocated memory should be referenced from memory regions in certain forms. If there is no reference to an allocated memory, that block is most likely leaked, however this may not always be the case as discussed below. Logically, the concept can be extrapolated so that valid memory blocks should be successive from a few basic points in the format of referencing chains. Since the chains are built based on the successive memory reference, they can be referred to as a contingency chain, i.e., in keeping with the application of contingency analysis to memory leak detection. None of the allocated memory should be out of the chains, otherwise there is a memory leak. Similarly, if several blocks were chained together via a referencing pointer, but the whole chain is not addressable from any other pointers or some root pointer, such memory blocks should also be considered leaks. Two basic methods for constructing contingency chains are: (1) Memory scan/search (FIG. 3). Each valid memory region (e.g. heap) should be searched to implicitly form the contingency chain. In general, this implementation could be slow, but it is less complicated and consumes less memory. (2) Explicitly build the chains (FIG. 4 to FIG. 5). Variations and combinations of these basic techniques will be known by those having ordinary skill in the art.

Whichever technique is utilized, there are several contingency chains to be built (either implicitly or explicitly) before proceeding to the memory leak identification. These chains are generally different from kernel memory management information lists, and will be used to compare to the kernel memory management information lists in order to detect and verify memory leaks. Thus, in the comparison of the contingency chains with the memory management information lists, if a block is valid in the memory management information while not in the contingency chains, it is considered as a candidate leaked block. Due to the volatility of memory usage, a revalidation is desired for confirming a potential leak and reducing the chances of falsely identifying a memory leak.

FIG. 3 is a flow chart illustrating one technique for memory leak detection. In this example, an "implicit" contingency chain is analyzed, i.e., the "building" of this contingency chain leverages the records maintained by OS memory management to determine whether a valid block in the memory pool is being referenced in any possible memory regions. No explicit contingency chain is built and no such record is kept in memory after the analysis is completed, with the idea that the contingency is a digestion of the memory usage from memory map thus memory map itself can also be used directly. This technique is useful where there is small number, e.g., in the range of thousands, of elements. This approach however can be slow if there are high numbers of elements, for example ten thousand or more allocated memory blocks. Using some relevant cues to examine allocated memory, e.g., a pointer containing the address of an allocated memory block, the cue (or pattern) recall is said to be positive when the pointer is found in memory regions and thus there is no memory leak for that block. However, when cue recall is negative, then a memory leak is possible and further validation should be performed. A part of the validation can be to check again whether the same pointer is still in the OS memory management list. If the pointer is still in the OS management list, i.e., cue recognition is positive, when cue recall is negative, then the memory block is indeed a memory leak. On the other hand, if the OS management list has no record of the pointer, i.e. cue recognition is negative when cue recall is also negative, then there is no memory leak.

In one embodiment, such memory analysis is implemented as follows. Operation begins at 300 and typically focuses on analyzing a single memory pool. However, if there are multiple pools or regions to be analyzed, the process illustrated in FIG. 3 can be repeated for each one as desired. In step 305 a particular memory block among those in the memory pool is selected as the target of examination. In one embodiment, memory block selection uses the OS's memory management information, e.g., a list of allocated blocks as seen by the kernel. In still another embodiment, block selection is performed by traversing the memory pool regardless of kernel memory management information. Next, it is determined whether the block is currently in use (310). In some implementations, the determination may have already been made by virtue of the manner in which the target block was selected, e.g., if the target block was selected from a memory management list, then it might be assumed that the OS believes the memory block to be allocated. In another example, the target block (or a corresponding memory data structure) can be examined directly, e.g., looking for a non-zero reference count, to determine if the memory block is allocated. If the target memory block is not allocated, operation transitions to 315 where it is determined whether there are additional blocks in the memory pool to examine. If so, operation returns to 305 where another target block is selected for examination. If not, all memory blocks in the pool have been examined and the process terminates at 350.

If the target memory block is in use as determined at 310, operation transitions to 320 where a determination is made if a contingency exists in some memory pool/region. In many implementations, a block allocated in one memory pool or region will not be referenced by an object outside that pool or region. However, this need not be the case, so the analysis performed in step 320 can include examination of various different memory pools or regions. For example, while some implementations might only search the heap subregion 220 as illustrated in FIG. 2, other implementations can also allow examination of uninitialized variable region 225, and initialized variable region 230. Search for the contingency can take a variety of forms. For example, the pointer to the target block can be used to check the application memory space to confirm the existence, e.g., reference by another object, of the pointer under investigation. This process might require the examination of the entire relevant memory space, or it may simply include the examination of certain portions of the memory space such as the header portions of all allocated memory blocks. Some operating systems may not have a well distinguished application memory space, and so all regions accessible by the application should be examined. In the examination process, the "cue" used is typically a bit pattern representing some or all of the target block's address. In some embodiments, care may need to be taken to distinguish data containing the cue from actual references to the target block, because such errors can lead to false-positive results. Thus, for example, only block user data (and not block headers) might be searched. If there exists a valid reference to the target block somewhere in the target memory space, then a contingency exists and operation transitions to 315 as described above. Any block for which no record can be found of its pointer's existence is a candidate memory leak.

The candidate memory leak is then verified (325). Verification is particularly important in systems where memory is routinely allocated and deallocated. Due to the dynamic nature of the OS at run time, the target memory block may just have been freed during the analysis for contingency, and therefore revalidation is implemented to check whether the block is really freed. If the block is no longer in the OS memory management list then it has been freed. This verification test can be performed in a number of different ways, and may itself include multiple tests. For example, a free block list can be examined to see if the target block is no available on that list. Tests such as those performed in 310 can be used to determine if the target memory block is still allocated. Still other tests might be used, such as deeper examination of certain memory block fields, e.g., caller PC, pointers to related blocks, etc. For example, multiple fields or pieces of information can be examined. So if the block being verified has the same caller PC, the same block address, and a non-zero reference count, then the block has been verified. Although not typically needed, in one embodiment step 325 is purposely delayed for a certain time period to help ensure that any pending deallocation operations are complete. In general, a variety of different verification steps can be performed. If the memory leak is not verified, operation transitions to 315 as described above. If the memory leak is confirmed, then it can be reported directly, e.g., step 335, or additional tests to provide further information about the leak can be performed.

For example, in 330 deallocated memory blocks are examined for the target memory block contingency. In general, this can include searching freed memory blocks (in whole or in part) for a reference to the target memory block using the same cue as used earlier in the process. This particular test is performed to try to identify dangling pointers, i.e., pointers pointing to a heap-dynamic block that has been deallocated. If such contingency exists, additional information is reported about the pointer (340). If no contingency exists in the freed blocks or if operation at 340 is complete, the memory leak is reported (335) with whatever level of specificity is desired, selected, or configured into the memory leak detection tool. The process then returns to 315 to handle the next target memory block. Note that in some cases, memory leak information is "reported" in the sense that the information is stored in an appropriate data structure, e.g., MLDS data structures 160, and only presented to the user at the conclusion of the analysis for the appropriate memory region(s)/pool(s).

As noted above, the process illustrated in FIG. 3 may be repeated for a number of different regions, subregions, or memory pools. Additionally, the process can be designed to target different types of memory objects, e.g., conventional heap memory blocks, packets, packet headers, buffers, etc. Such variations can be incorporated, for example, into steps such as 320 just as that step can include examination of all "visible" memory regions.

A second approach, where an explicit contingency chain is constructed, is illustrated in FIG. 4 and FIG. 5. In general, a contingency chain is built while checking whether the content of a valid memory block in the memory pool has pointers to any valid memory blocks in the memory management list. If there are pointers, the chain is updated. The second approach is generally more complicated, but it is useful as a complement of the first method when many memory blocks are allocated and thus there are potentially more false-positive or false-negative memory leaks and increased analysis time.

Operation begins at 400 and typically focuses on analyzing a single memory pool. However, if there are multiple pools or regions to be analyzed, the process illustrated in FIG. 4 and FIG. 5 can be repeated for each one as desired. In step 405 a particular memory block among those in the memory pool is selected as the target of examination. In one embodiment, memory block selection uses the OS's memory management information, e.g., a list of allocated blocks as seen by the kernel. In still another embodiment, block selection is performed by traversing the memory pool regardless of kernel memory management information. Next, it is determined whether the block is currently in use (410). In some implementations, the determination may have already been made by virtue of the manner in which the target block was selected, e.g., if the target block was selected from a memory management list, then it might be assumed that the OS believes the memory block to be allocated. In another example, the target block (or a corresponding memory data structure) can be examined directly, e.g., looking for a non-zero reference count, to determine if the memory block is allocated. If the target memory block is not allocated, operation transitions to 415 where it is determined whether there are additional blocks in the memory pool to examine. If so, operation returns to 405 where another target block is selected for examination. If not, all memory blocks in the pool have been examined, the contingency chains have been constructed, and the process transitions to FIG. 5 (as described below) where analysis of the contingency chains is performed.

If the target memory block is in use as determined at 410, operation transitions to 420 where a determination is made if there is a contingency chain for the target block, e.g., indexed by the target block address. If not, an entry is added to the contingency chain using the target blocks address as an index value (425). Upon completion of step 425, or if there already exists an entry for the target memory block, operation transitions to 430. Here the target memory block is analyzed for any references to other memory blocks (generally not including itself, but in some implementations such references can be tracked or accommodated). For example, every byte, or multiple bytes as appropriate based on the platform, in the current block is compared to the known pointers of valid memory blocks in the memory management list. Such pointers can be retained in a separate data structure, cache, or simply accessed as needed. If some location in the target block has the cue bit pattern of the pointer of a valid block, the current memory block is said to have the contingency of that block, i.e., recall has been confirmed, and operation transitions to 440. Note that there are a number of different techniques that can be used for analyzing the target memory block. For example, it may only be necessary to analyze a header portion of the memory block if such information is stored in header area of a memory block. Similarly, addresses to other valid memory blocks may be constructed such that identifying them requires searching only for portions of the address. Those having ordinary skill in the art will recognize a variety of different techniques for making the determination of step 420.

If another pointer is not found, as determined in 430, operation transfers to 435. If there are additional portions, of the block to examine, operation returns to 430, otherwise operation returns to 415 as described above. In step 440, an entry is added to the contingency chain for the memory block corresponding to the pointer found. Using FIG. 6B as an example, when the search of memory block 0xABCD yields a reference to another memory block, e.g., block 0x1234, then an entry is added "0xABCD" to the contingency chain for block 0x1234. As noted above, care may need to be taken to distinguish data containing cues from actual references to valid memory blocks, because such errors can lead to false-positive results.

If the found pointer does not have its own entry in the contingency chain as determined at 445, such an entry is created explicitly in 450, typically using the pointer value as an index value. If such an entry already exists, operation returns to 435 as described above.

The process thus continues so that all allocated block on the memory management list are examined. If it is necessary to examine other regions, subregions, or pools to complete construction of the contingency chains, then such additions to the process, e.g., looping through all relevant memory regions such as BSS, data, etc., can be performed. Any contingency will also be added to the contingency records if any block with the address is found. Examining all relevant memory regions is useful for increasing the likelihood of successful recall and recognition. In still other examples, different contingency chains are constructed for different memory regions, subregions, or pools.

Once the process of constructing the contingency chains is complete, the contingency chains are analyzed. This is illustrated in FIG. 5. If any record has empty content, i.e. no contingency, that record corresponds to a suspected memory leak. A verification is performed to check whether the relevant memory block has subsequently been freed or is in the process of being freed. If the block is still valid, then recognition is confirmed and the block is reported as a memory leak. If a record has some contents then it is a candidate for recall. However, extra effort should be used to verify whether the content in the record points to another record which may finally point back to the record itself, and to verify whether the content is a dangling reference. If it is confirmed that a loop exists, then it is a variance of the memory leak and again recognition has been reached.

Thus, in step 500, a particular index of the contingency chain is selected. If it is determined in 505 that there are one or more contingencies corresponding the record, e.g., see index 0x1234, 0x5678, 0xBCDE, and 0x89AB, then the assumption is that the memory block corresponding to the index value is not a leak, and operation transitions to 510. As will be seen below, this assumption might not be correct. If there are additional uninspected index entries, as determined in 510, then operation returns to 500. If there are no more entries, then operation terminates 540.

If there is no contingency for the selected index value, e.g., see index 0xABCD, then the corresponding memory block is a suspected leak, and verification is required in 515. Verification is particularly important in systems where memory is routinely allocated and deallocated. Due to the dynamic nature of the OS at run time, the target memory block may just have been freed during the analysis for contingency, and therefore revalidation is implemented to check whether the block is really freed. If the block is no longer in the OS memory management list then it has been freed. This verification test can be performed in a number of different ways, and may itself include multiple tests. For example, a free block list can be examined to see if the target block is no available on that list. Tests such as those performed in 410 can be used to determine if the target memory block is still allocated. Still other tests might be used, such as deeper examination of certain memory block fields, e.g., caller PC, pointers to related blocks, etc. Although not typically needed, in one embodiment step 515 is purposely delayed for a certain time period to help ensure that any pending deallocation operations are complete. In general, a variety of different verification steps can be performed. If the memory leak is not verified, operation transitions to 510 as described above. If the memory leak is confirmed, then it can be reported directly, e.g., step 535, or additional tests to provide further information about the leak can be performed.

For example, upon verification of a memory leak in 515, the contingency chain can be reexamined for entries where the newly discovered leaked memory block is the only contingency. The value of such an operation can be seen by reference to FIG. 6B. Once block 0xABCD is identified as a leak, i.e., it has no contingencies and its status as a memory leak has been verified, then it can be seen that any memory blocks used only by block 0xABCD, e.g., 0x5678, also represent memory leaks. This is because a block that is only references by a memory leak block must necessarily be a memory leak itself. Deallocating memory block 0xABCD will leave memory block 0x5678 with no valid references to the block. Consequently, it too should be indicated as a memory leak.

Additional operations, such as 525 and 530 can also be performed. For example, in 525 deallocated memory blocks are examined for the target memory block contingency. In general, this can include searching freed memory blocks (in whole or in part) for a reference to the target memory block using the same cue as used earlier in the process. This particular test is performed to try to identify dangling pointers. If such contingency exists, additional information is reported about the pointer (530). If no contingency exists in the freed blocks or if operation at 530 is complete, the memory leak is reported (535) with whatever level of specificity is desired, selected, or configured into the memory leak detection tool. The process then returns to 510 to handle the next target memory block. Note that in some cases, memory leak information is "reported" in the sense that the information is stored in an appropriate data structure, e.g., MLDS data structures 160, and only presented to the user at the conclusion of the analysis for the appropriate memory region(s)/pool(s). As noted above, the process illustrated in FIGS. 4 and 5 may be repeated for a number of contingency chains.

The flow charts of FIG. 3 to FIG. 5 and the systems, methods, and techniques described herein illustrate some of the many operational examples of memory leak detection system use disclosed in the present application. Those having ordinary skill in the art will readily recognize that certain steps or operations described or illustrated can be eliminated or taken in an alternate order. Moreover, the methods described and modules illustrated are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figures 6A, 6B:
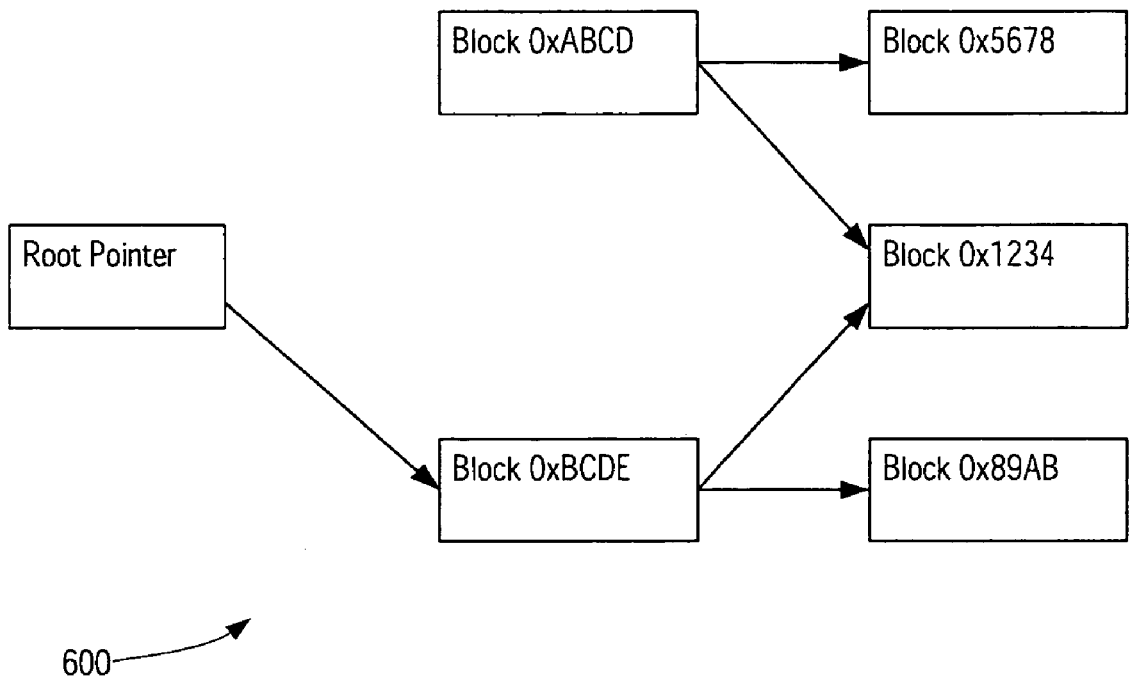
FIG. 6A and FIG. 6B illustrate the simplified relationships among several memory blocks and a corresponding set of contingency information, respectively.

FIG. 6A and FIG. 6B illustrate the simplified relationships among several memory blocks and a corresponding set of contingency information, respectively. FIG. 6B illustrates a contingency chain as constructed by, for example, a process such as that illustrated in FIG. 4. For reference, FIG. 6A illustrates the relationship among the various memory blocks analyzed and reflected in the contingency chain of FIG. 6B. In this example, arrows between memory blocks represent the existence in the "from" block of a pointer referencing the "to" block. Thus, the absence of an arrow pointing to memory block 0xABCD suggests that it, and perhaps any memory blocks referred to only by it, represents a memory leak. The memory organization shown in FIG. 6A is merely illustrative, and those having ordinary skill in the art will recognize that a variety of different memory organization schemes can utilize the memory leak detection systems and techniques described in the present application.

The direct application of Kahana's contingency analysis, along with the use of correlational techniques such as Yule's Q, help to confirm desirable approaches to building memory leak detection tools that provide high memory leakage detection yield. The statistic of successful analysis is generally confirmed by, for example, the Q number. In the process of developing the memory leak detection tools, one can consistently build the contingency table to keep track number of occurrences of recognition (test 1) and recall (test 2) and their relationship to get the values for A, B, C, D. From those values, a Q value can be calculated as described above. The higher the Q value, the lower the noise level generated by the memory leak detection tool. Using the Q value as a reference, memory leak detection tool parameters can be adjusted to increase the likelihood of definite memory leak detection.

Although the examples above have generally emphasized embedded system applications, e.g., the operation of IOS on a network device, these same systems, methods, techniques, and software can be used in a variety of different computing systems.

Figure 7:
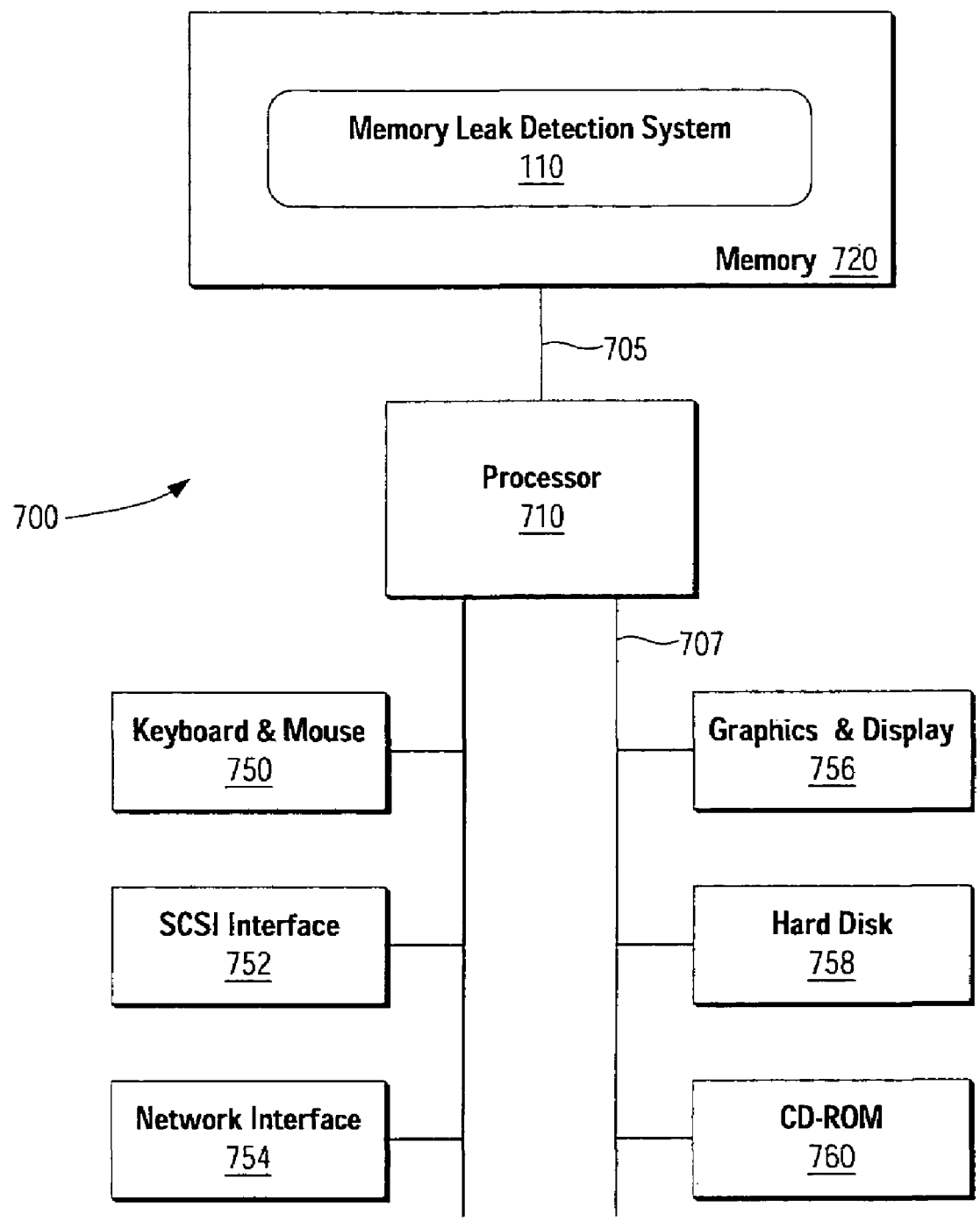
FIG. 7 is a block diagram of a computer system for implementing the techniques of the present invention.

For example, FIG. 7 illustrates a block diagram of a computer system 700 for implementing the memory leak detection techniques of the present invention. For example, computer system 700 can be an embodiment of one of the previously described hosts. Computer system 700 includes a processor 710 and a memory 720 coupled together by communications bus 705.Processor 710 can be a single processor or a number of individual processors working together. Memory 720 is typically random access memory (RAM), or some other dynamic storage device, and is capable of storing instructions to be executed by the processor, e.g., MLDS 110. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 230 and 262 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 458, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fiber channel interface.

In accordance with an embodiment of the invention, reference to the first allocated memory block includes reference variance. The reference variance can be, for example, due to pointer manipulation.

In accordance with an embodiment of the invention, searching for a reference to the first allocated memory block also includes searching data portions other than the header of the other allocated memory blocks. Further, the system may be designed to exclude the header portion while searching data portions of the other allocated memory blocks for reference.

In accordance with an embodiment of the invention, searching other allocated memory blocks of the plurality of allocated memory blocks includes searching for at least an occurrence or multiple occurrences of the first allocated memory block address in the other allocated memory blocks of the plurality of allocated memory blocks.

In accordance with an embodiment of the invention, verifying that the first allocated memory block is a memory leak includes determining whether the first allocated memory block has been deallocated during the analysis.

In accordance with an embodiment of the invention, detecting memory leaks in a system includes generating a second stack comprising a plurality of memory blocks that are allocated at time of generating the second stack.

In accordance with an embodiment of the invention, there are two validation phases to enable successive checking. The tasks that can be performed in the validation phase can include identifying the status of the blocks.

In accordance with an embodiment of the invention, root refers to the memory block at the first block of a contingency chain or the first block of a serial of allocated memory block.

Various embodiments of the invention provide methods and systems to detect memory leaks and deallocate detected memory leaks by successively validating the detected memory leaks, i.e., performing more than one validation phases for the potential memory leaks identified in the detection phase. Various embodiments of the invention provide methods and systems to reduce the number of false alarms produced during detection of memory leaks. False alarms may be caused by race condition and as a result of pointers being moved by programs while the memory leaks are being detected. In accordance with various embodiments of the invention, a memory leak detector is provided to detect the memory leaks. The provided memory leak detector can further deallocate leaked memory in a system.

The memory leak detection and deallocation, in accordance with various embodiments of the invention, can be performed without VM hardware support. Further, various embodiments of the invention detect memory leaks with reduced false alarms without the support of VM hardware and without freezing the execution of any applications or programs. Various embodiments of the invention, therefore, can be implemented to detect and deallocate memory leaks in systems that cannot be frozen, or systems that do not have VM hardware and allowing real time guarantees. Hence, the various embodiments of the invention can be implemented for system such as Operating System (OS) kernels, and real time systems. The detection of memory leaks is performed in two or more phases. The detected memory leaks may be reported and/or deallocated in accordance with various embodiments of the invention.

In various embodiments of the invention, the scheduling of the memory leak detection is performed by the kernel of the system, which schedules the execution of various programs within the system. The scheduling is typically based on the priority of the programs. To avoid freezing of applications or programs, in various embodiments of the present invention, the process of memory leak detection is attributed a low priority for the scheduling. Therefore, the memory leak detection is performed without interrupting or preventing other higher priority programs from being executed. Further, when the memory leak detection is being performed, another program of higher priority can preempt the memory leak detection.

In accordance with various embodiments of the invention, the memory leak detection and/or deallocation may be triggered by a user, for example, with the help of a Command Line Invocation (CLI). In accordance with various embodiments of the invention, the memory leak detection and/or deallocation may be triggered based on the amount of available unallocated memory. Specifically, the memory leak detection and/or deallocation may be triggered if the available unallocated memory blocks fall below a predetermined limit. This limit may be user defined.

Figure 8:
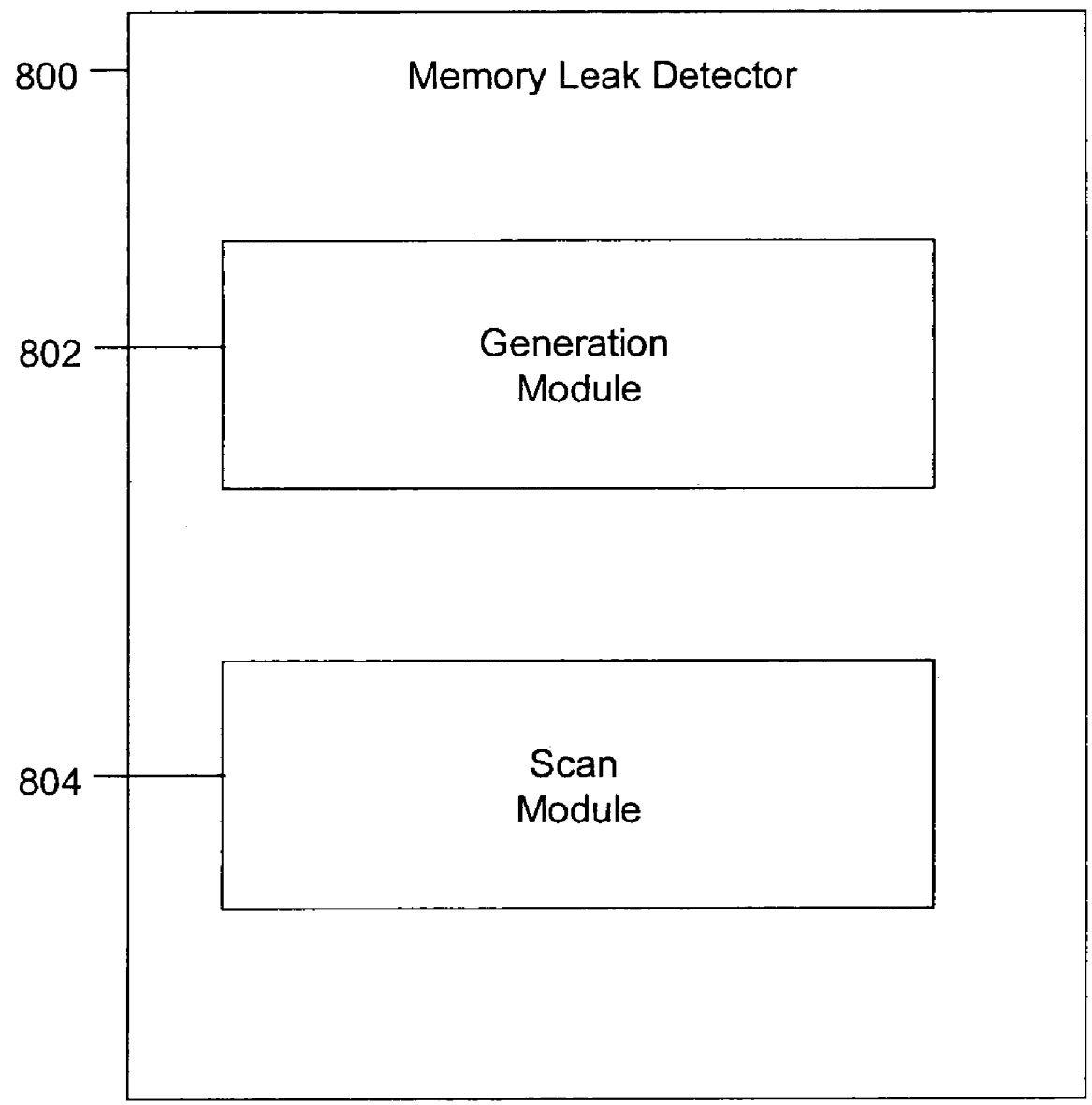
FIG. 8 is a block diagram illustrating a memory leak detector, in accordance with various embodiments of the present invention.

FIG. 8 is a block diagram illustrating a memory leak detector 800, in accordance with various embodiments of the invention. Memory leak detector 800 detects memory leaks in a system as described earlier, for example, an OS. Memory leak detector 800 can detect memory leaks without virtual memory hardware support. In accordance with various embodiments of the invention, memory leak detector 800 is implemented as a software module. In accordance with various embodiments of the invention, memory leak detector 800 may be included as a part of the OS.

The detection of memory leaks is performed by memory leak detector 800 in two or more phases, namely a detection phase and one or more validation phases. To perform memory leak detection, memory leak detector 800 includes a generation module 802 and a scan module 804. Generation module 802 and scan module 804 help detecting potential memory leaks and successively validating the defected potential memory leaks. Generation module 802 generates and modifies stacks that include memory blocks. The memory blocks may be root blocks or may be allocated memory blocks. Root blocks are memory blocks that include roots.

Scan module 804 is responsible for popping, pushing and scanning memory blocks to be scanned. In general, when a memory block is to be pushed or popped, a data structure that is used to represent the memory block is pushed or popped out of a stack. Further, scan module 804 scans the generated and modified stacks for pointers that reference allocated memory blocks. The scanning is performed by scanning the memory blocks, which are represented by the data structures that populate the stack. In accordance with an embodiment, the data structure used to represent a memory block may be a pointer to the memory block. In accordance with another embodiment, the data structure may be data that includes information that helps identify the memory block and holds data relating to the memory block. The referenced and scanned memory blocks are removed from the stacks they are contained in by scan module 804. Scan module 804 is further responsible for identifying the memory leaks and potential memory leaks. The functions of generation module 802 and scan module 804 are described further in detail.

Figure 9:
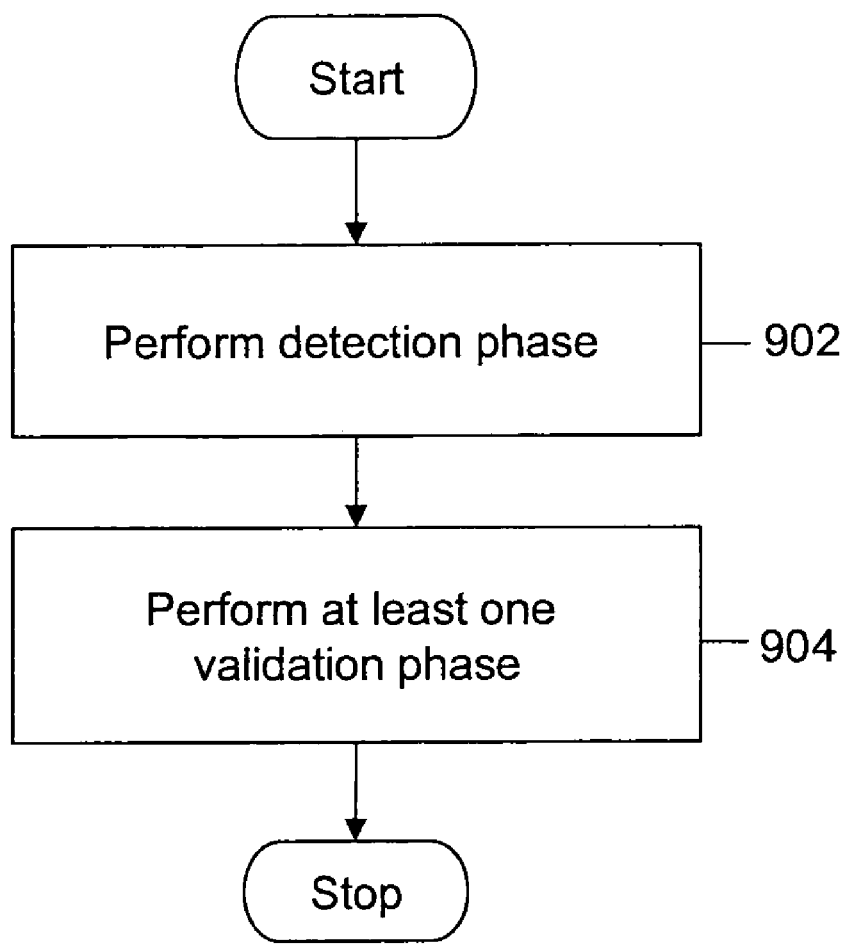
FIG. 9 is a flowchart illustrating a method of detecting memory leaks, in accordance with various embodiments of the present invention.

FIG. 9 is a flowchart illustrating a method of detecting memory leaks, in accordance with various embodiments of the invention. As described earlier, memory leak detector 800 performs leak detection in two or more phases. At step 902, the first phase, that is the detection phase, is performed. The method of performing the detection phase is described in detail in conjunction with FIG. 10. The detection phase is used to identify potential memory leaks. The detection phase is followed by one or more validation phases performed in accordance with step 904. The potential memory leaks are validated in the validation phases to enable the identification of the memory leaks. In various embodiments of the invention, a random amount of time is allowed to elapse between each of the validation phases.

Figure 10A:
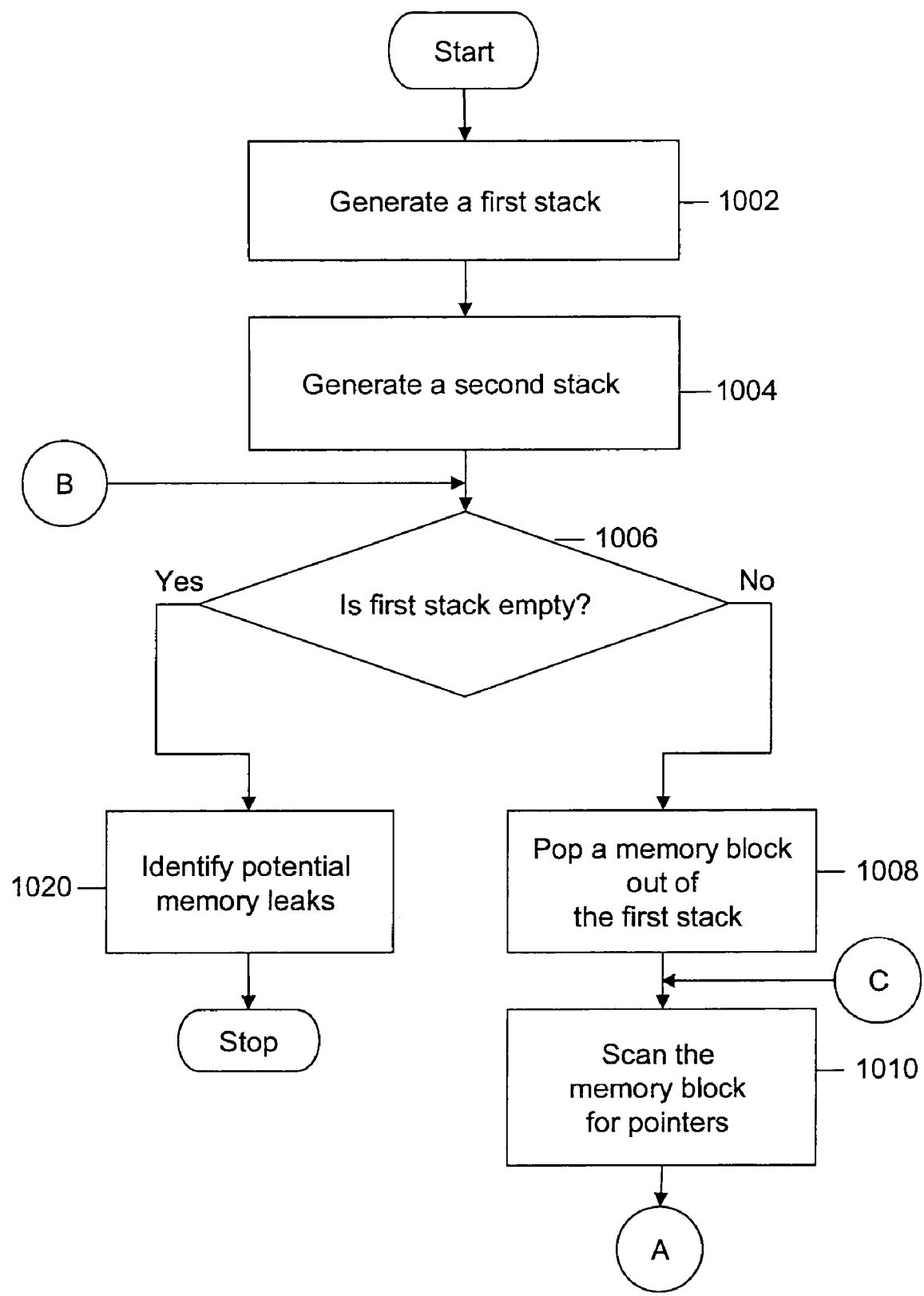
FIGS. 10A and 10B are flowcharts illustrating a method of performing the detection phase, in accordance with various embodiments of the present invention.
Figure 10B:
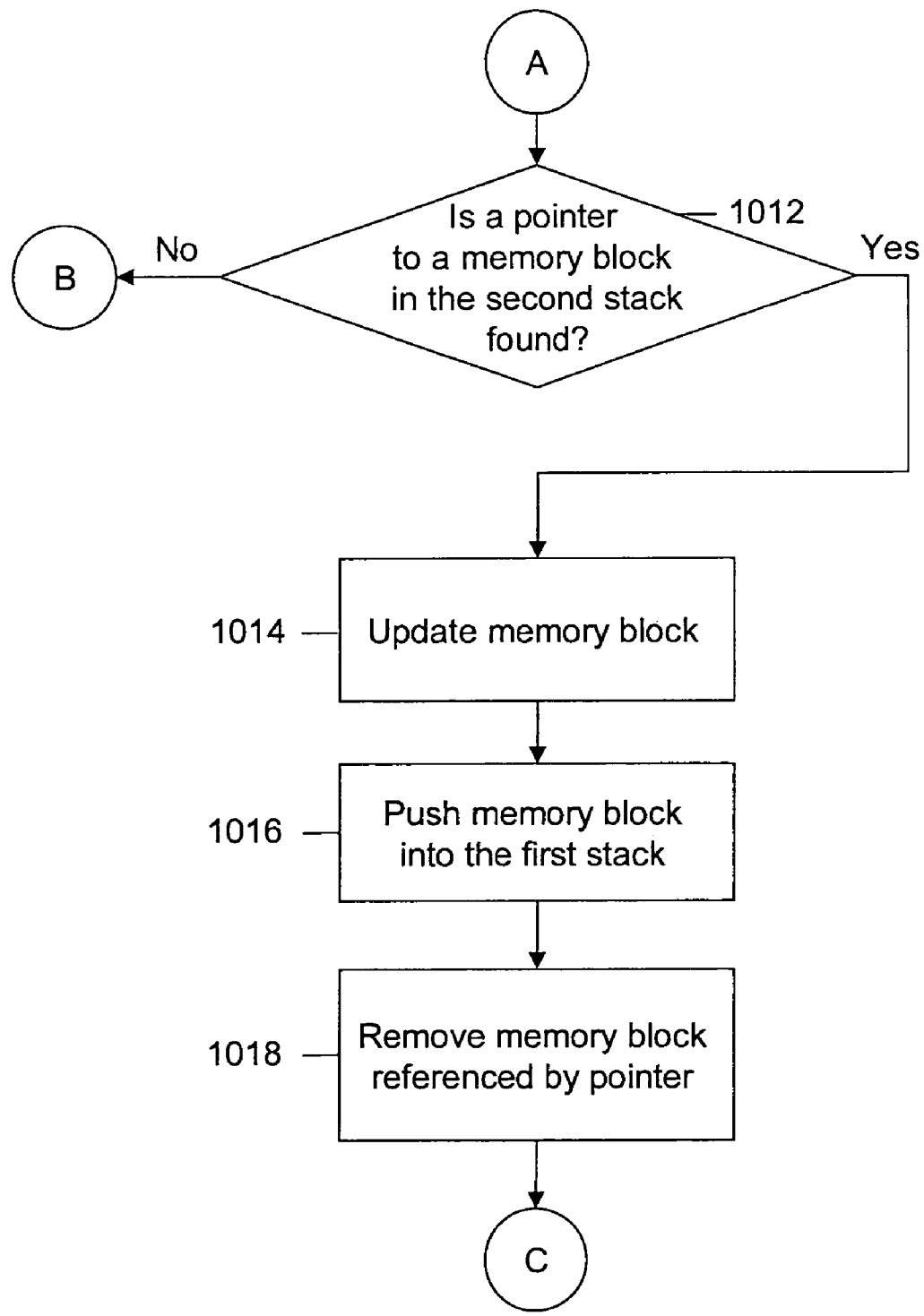

FIG. 10 is flowchart illustrating the method of performing the detection phase, in accordance with various embodiments of the invention. At step 1002, a first stack of memory blocks is generated. Accordingly, all the root blocks are pushed into the first stack. As mentioned earlier, the root blocks are the memory blocks that contain roots. At step 1004, all allocated memory blocks are pushed into a second stack. Some of these allocated memory blocks may be alive memory and some may be memory leaks.

At step 1006, it is checked if the first stack is empty. If the first stack is not empty then at step 1008, a memory block is popped out of the first stack. At step 1010, this memory block is scanned for pointers that reference a memory block in the second stack.

If a pointer is found, while scanning, in accordance with step 1012, then at step 1014, the memory block that is being currently scanned is updated with the address where the pointer was found. This updated memory block is then pushed back into the first stack at step 1016. Therefore, when the pushed memory block is popped again for scanning, the scanning starts from the address where the pointer was found. At step 1018, the memory block that is referenced by the found pointer is removed from the second stack. Following this, the scanning is performed on this removed memory block, in accordance with steps 1010-1018. During such successive scanning, if no pointer referencing the memory block in the second stack is found at step 1012, then steps 1006-1012 are repeated, i.e., the next memory block is popped and scanned for pointers.

In case, at step 1006, it is found that the first stack is empty, i.e., all the memory blocks in the first stack have been popped out and scanned for pointers, then at step 1020, the potential memory leaks are identified. The identified potential memory leaks are the memory blocks that remain in the second stack when the first stack is empty. These memory blocks are, therefore, the memory blocks that have not been referenced by any pointers in the detection phase.

The detected memory leaks at this point are not conclusive because the target system/application might have been moving pointers around, since the target system/applications are not frozen when the leak detection is in progress. Further, the reachability may also be affected due to pointers being moved by programs that are executed while the memory leaks are being detected. Therefore, to minimize the effect and to reduce false alarms, the detected potential memory leaks are validated. The potential memory blocks are validated in the validation phases that follow the detection phase, as described with respect to FIG. 9.

Figure 11A:
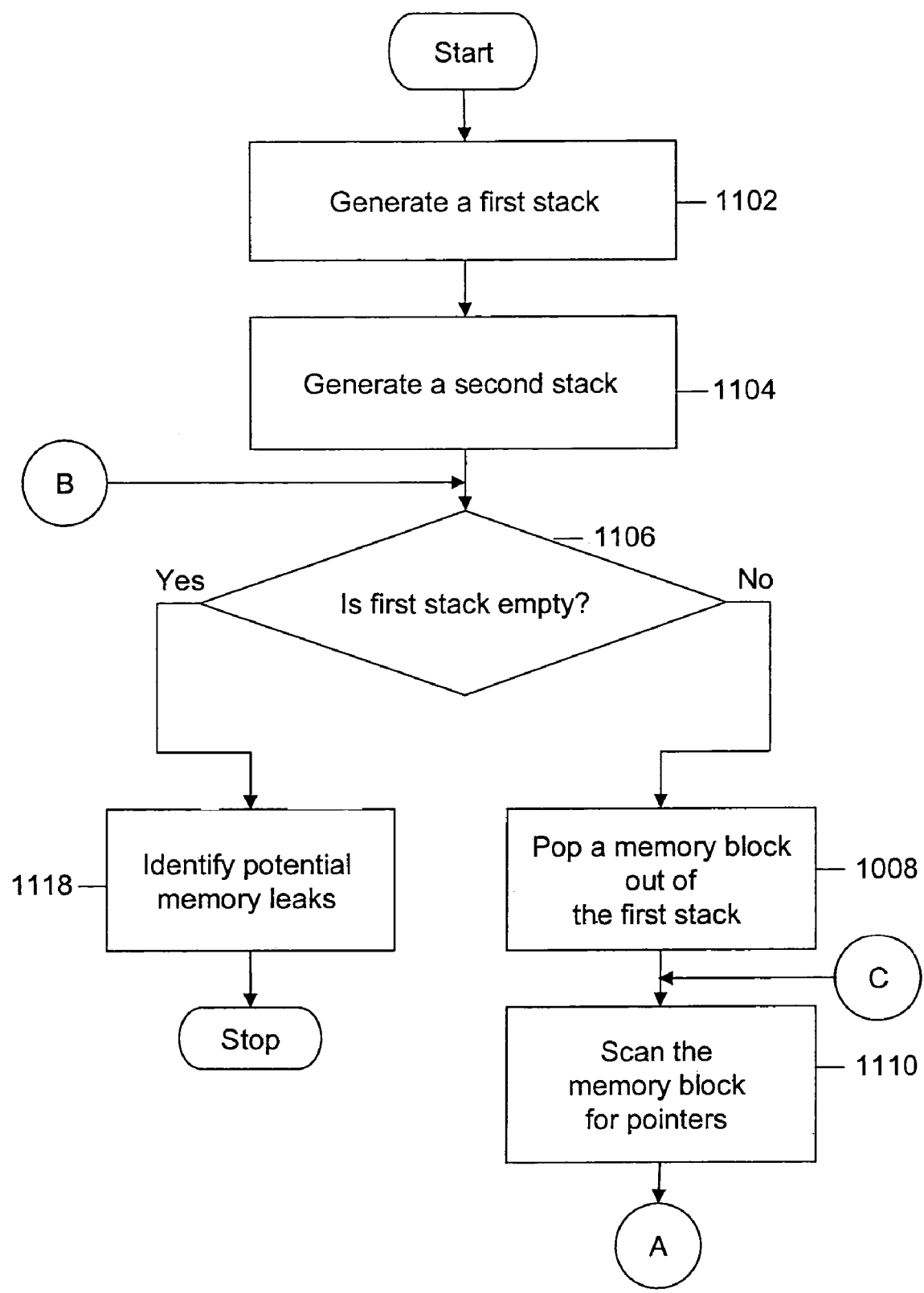
FIGS. 11A and 11B are flowcharts illustrating another method of performing the detection phase, in accordance with an embodiment of the present invention.
Figure 11B:
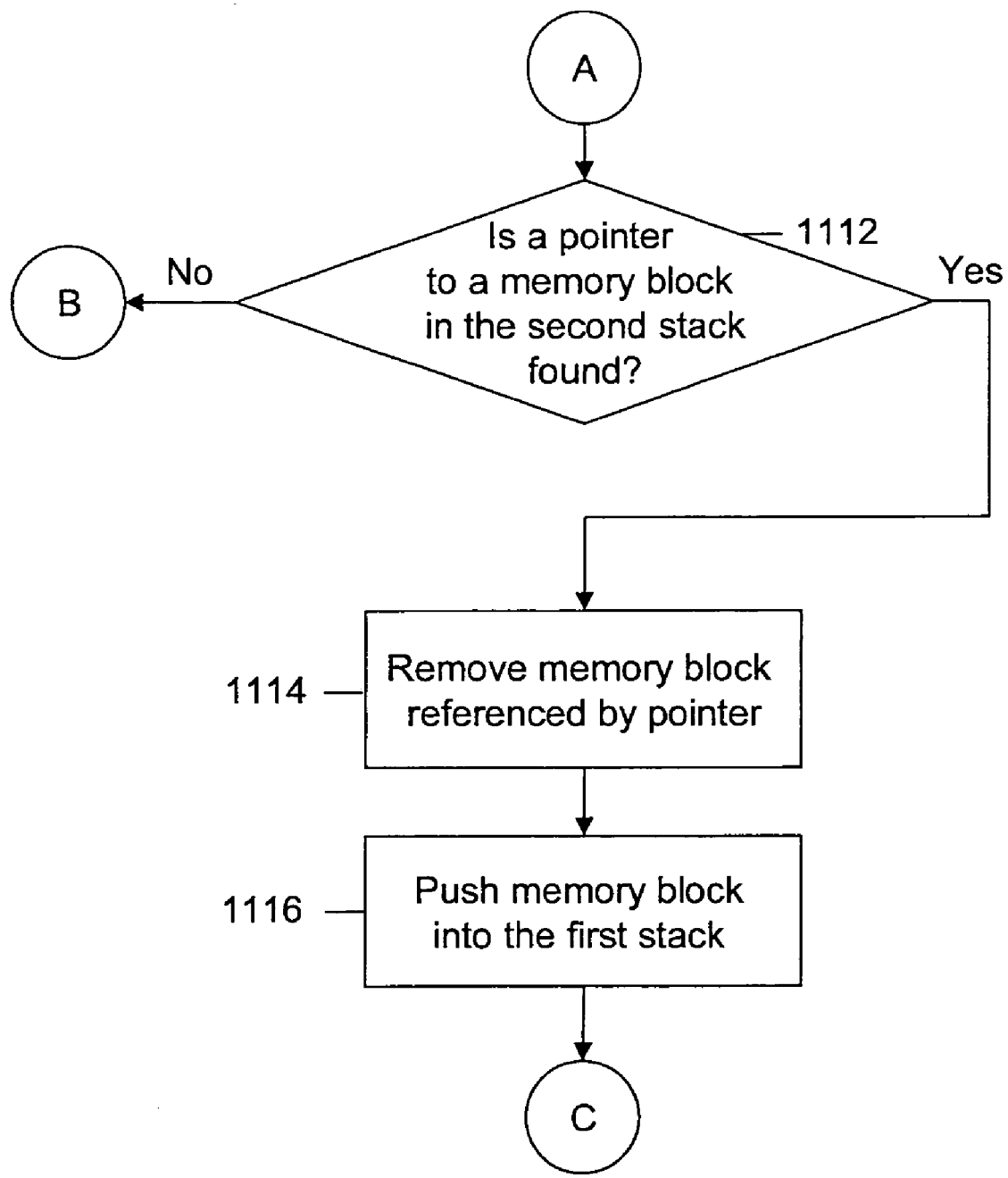

FIG. 11 is flowchart illustrating an alternative method of performing the detection phase, in accordance with various embodiments of the present invention. At step 1102, the first stack is generated as described earlier. At step 1104, the second stack is generated as described earlier. At step 1106, it is checked if the first stack is empty. If the first stack is not empty, then at step 1108, a memory block is popped out of the first stack. At step 1110, this block is scanned as described earlier. Then, at step 1112, it is checked if a pointer is found. In case no pointer is found, then steps 1106-1112 are repeated.

In case a pointer is found, the memory block that is referenced by the found pointer is removed from the second stack at step 1114. At step 1116, this removed memory block is then pushed into the first stack. Following this the steps 1110-1116 are repeated.

If at step 1106, it is found that the first stack is empty, then as described earlier, the potential leaks are identified at step 1118.

The detection phase results in detecting of the potential memory leaks. These potential memory leaks, however, need to be validated before these can be pronounced as the memory leaks. The potential memory leaks are then successively validated using one or more validation phases. The validation phases are similar algorithmically to the detection phase, however with the following key differences: (1) The roots of each validation phase comprises not only the roots of the previous phase but this root set is also expanded with the newly referenced, scanned blocks in the previous phase, i.e., all blocks scanned in the previous phase are treated as roots. Therefore there is root expansion and this in combination with scanning algorithms described considerably minimizes false alarms. (2) The order in which the roots are pushed into the first stack is varied or randomized. Also, a random amount of time is allowed to elapse between each of the phases. Further, all the newly allocated memory blocks are pushed in the first stack. The contents of the second stack at the end of a detection phase or a preceding validation phase are the potential memory leaks. The potential memory leaks are left as they are in the second stack for the validation phase. In the validation phase, some of the potential memory leaks may be found to be alive and are removed from the second stack. Therefore, the validation phase that follows uses only the memory blocks that remained in the second stack at the end of the previous phase. Hence, in all the subsequent validation phases nothing is added to the second stack.

Further, the validation phase proceeds like the detection phase, i.e., steps 1006-1022 are performed. In various embodiments of the invention, due to the nature of steps 1006-1022, the validation phases are more tuned towards scanning the memory blocks that are newly found to be alive. This means that when it is determined that a memory block which was considered to be a potential memory leak has been discovered to be alive (by meeting a reference to it when scanning), the scanning for pointers is immediately started from this referenced memory block, rather than proceeding to scan the memory block that had already been scanned in the previous phase. This may lead to the finding of other memory blocks that are currently included in the second stack as potential memory leaks and they would be scanned too, before proceeding to the memory blocks that had already been scanned in the previous validation phases. By doing this, the overall time taken to scan a set of related data structures is much more reduced (since nothing else is scanned before completing the scan of the new memory blocks that are found to be alive) than in its previous validation phase. This reduces the time frame in which the system application may move pointers in this data structure to cause problems, which could cause false alarms.

In accordance with various embodiments of the invention, the number of validation phases to be performed for memory leak detection and deallocation, may be a predetermined number. In accordance with various other embodiments of the invention, the number of validation phases to be performed may be determined based on the dynamicity of the system for which the memory leaks are to be detected. In accordance with various embodiments of the invention, performing the validation of the potential memory leaks is ceased when a predetermined number of successive validation phases yield the same potential memory leaks.

At the end of the last validation phase, the allocated memory blocks that remain in the second stack, when the first stack is empty, are validated as memory leaks. In accordance with various embodiments of the invention, the validated memory leaks are reported to the user. The reports may include information related to the leaked memory blocks, for example, the information may include details about the contents of the allocated memory blocks and the address of the leaked memory blocks. For example, the report may include the address of the instruction that allocated the leaked memory, and the name of the leaked memory block. In accordance with an embodiment of the invention, the Process Identifier (PID) of the process that allocated the leaked memory block or any other identifier to identify the resource that allocated the leaked memory block may also be displayed. This report may help the user to identify leaked memory blocks that can be reclaimed.

In accordance with various embodiments of the invention, the detection and validation of memory leaks may be followed by deallocation or reclaiming of the memory leaks. Users may configure the deallocation by using CLI or it may be programmed through a provided interface. In accordance with various embodiments of the invention, in case deallocation is configured after the leak report is generated, it is checked if a filter is configured. In case no filter is configured, every item in the report is deallocated. In accordance with various embodiments of the invention, the deallocation may be performed by using filters that are applied to the validated memory leaks. Accordingly, the memory leaks that pass the filter are then deallocated.

Figure 12:
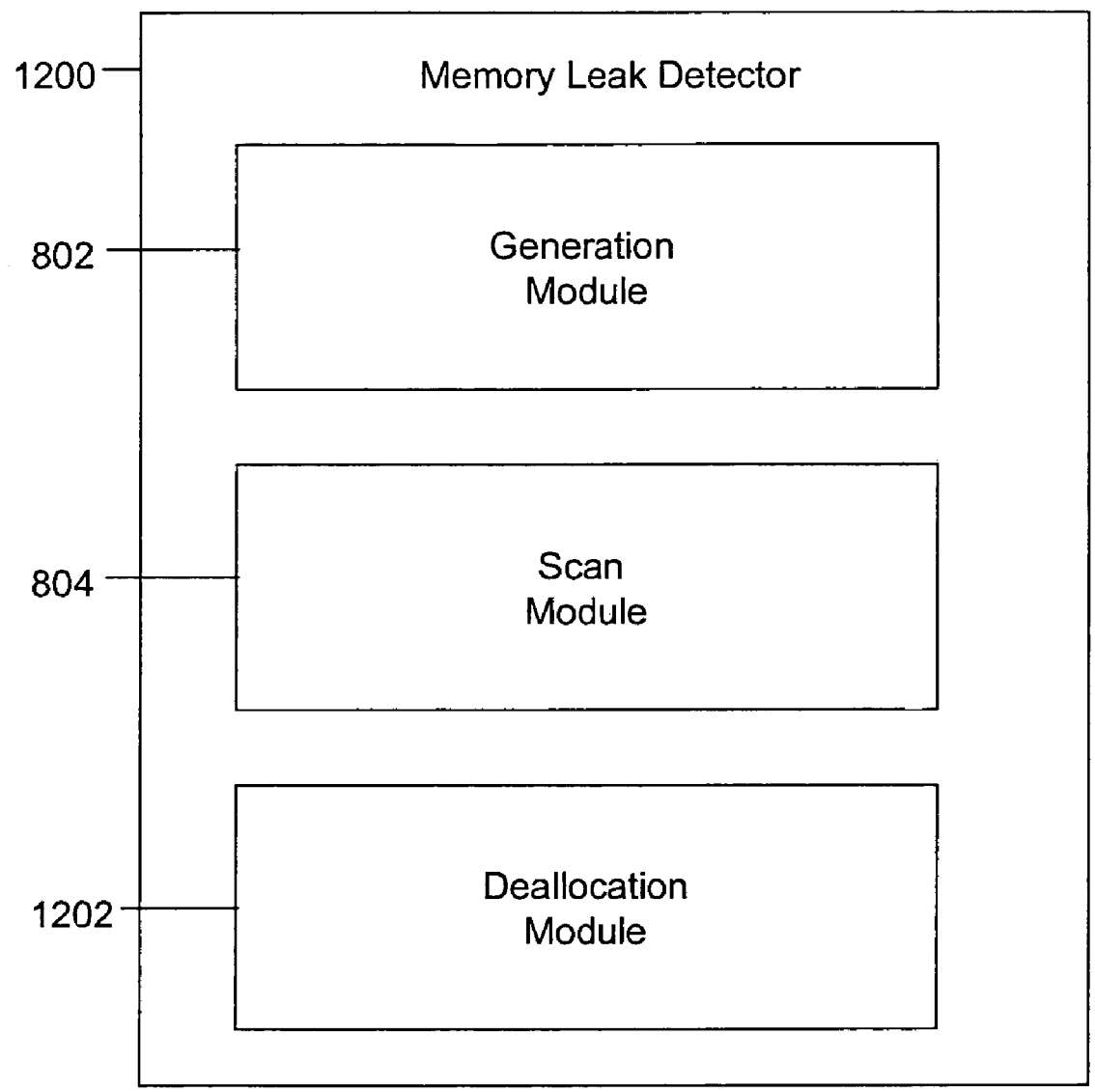
FIG. 12 is a block diagram illustrating a memory leak detector for deallocating memory leaks, in accordance with various embodiments of the present invention.

FIG. 12 is a block diagram illustrating a memory leak detector 1200 for deallocating memory leaks, in accordance with various embodiments of the present invention. Memory leak detector 1200 includes generation module 802, scan module 804 and a deallocation module 1202. The functions of generation module 802 and scan module 804 have been described in conjunction with FIG. 8. Deallocation module 1202 performs the deallocation of the validated memory leaks. The deallocation, in accordance with various embodiments of the invention, is performed based on filters. In an embodiment, a user may configure these filters.

Figure 13:
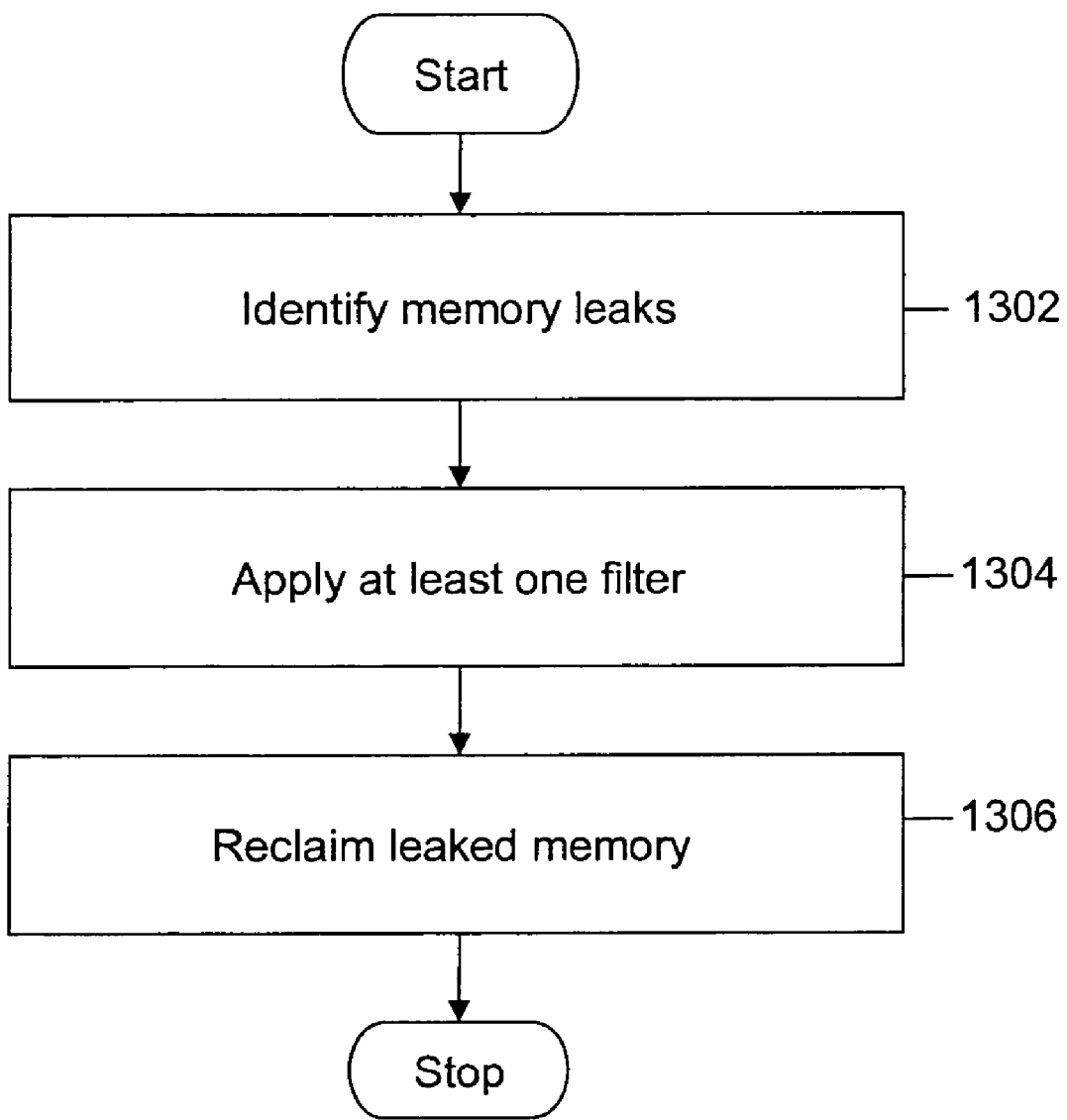
FIG. 13 is a flowchart illustrating a method of deallocating memory leaks, in accordance with various embodiments of the present invention.

FIG. 13 is a flowchart illustrating the method of deallocating memory leaks, in accordance with various embodiments of the invention. At step 1302, memory leaks are identified. An exemplary method for identifying the memory leaks is described with reference to FIG. 10. At the step 1304, at least one filter is applied to the identified memory leaks. At step 1306, the memory leaks that are allowed by the filter are reclaimed. Thus, leaked memory blocks are freed after being detected.

In accordance with various embodiments of the invention, the filters may be configured based on specific data, for example address of the instruction that allocated the memory leaks. In accordance with various embodiments of the invention, the filter may be configured to search for patterns at specified offsets in the data contained in the leaked memory blocks.

Figure 14:
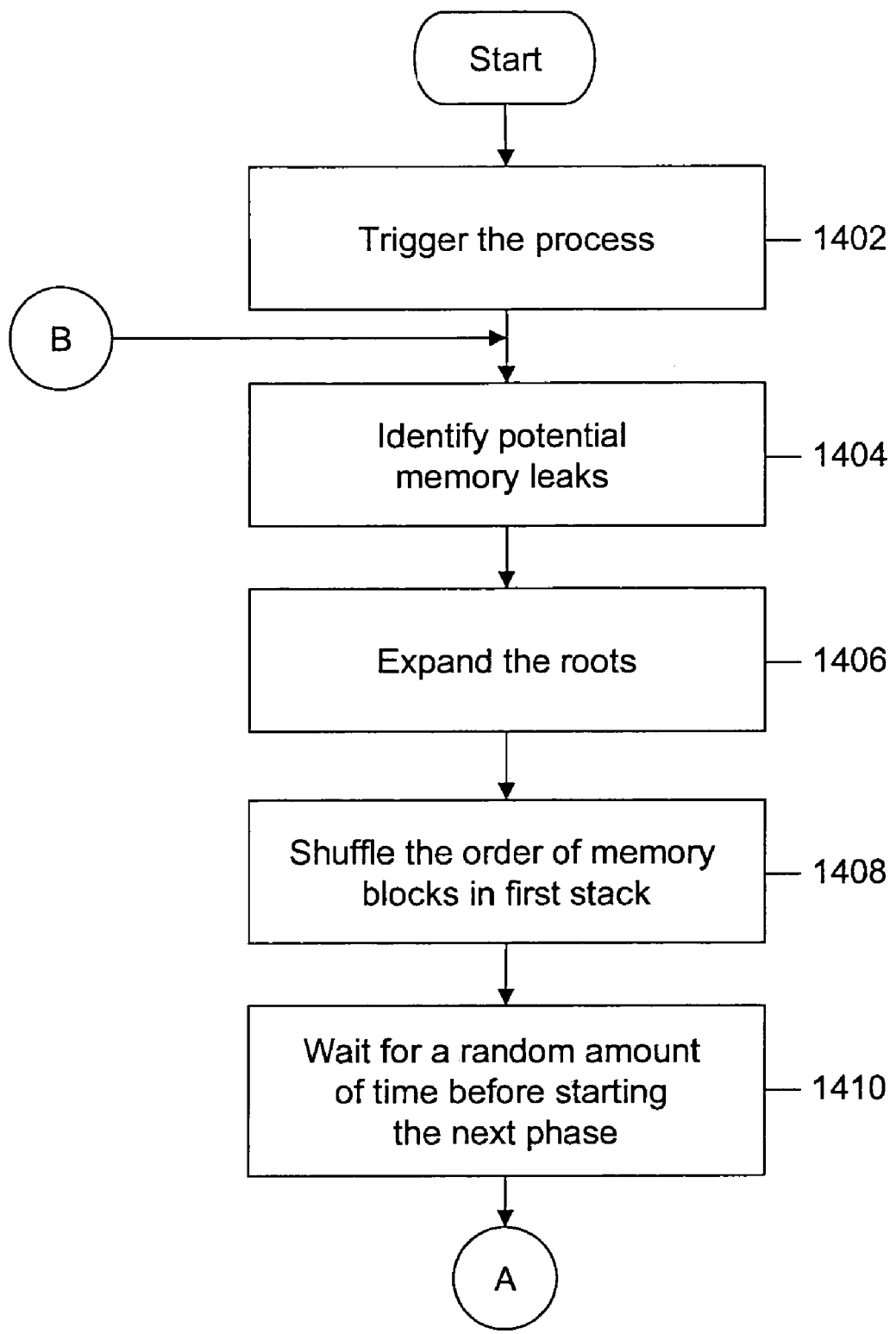
FIGS. 14A and 14B are flowcharts illustrating an exemplary method of detecting and deallocating memory leaks.
Figure 14:
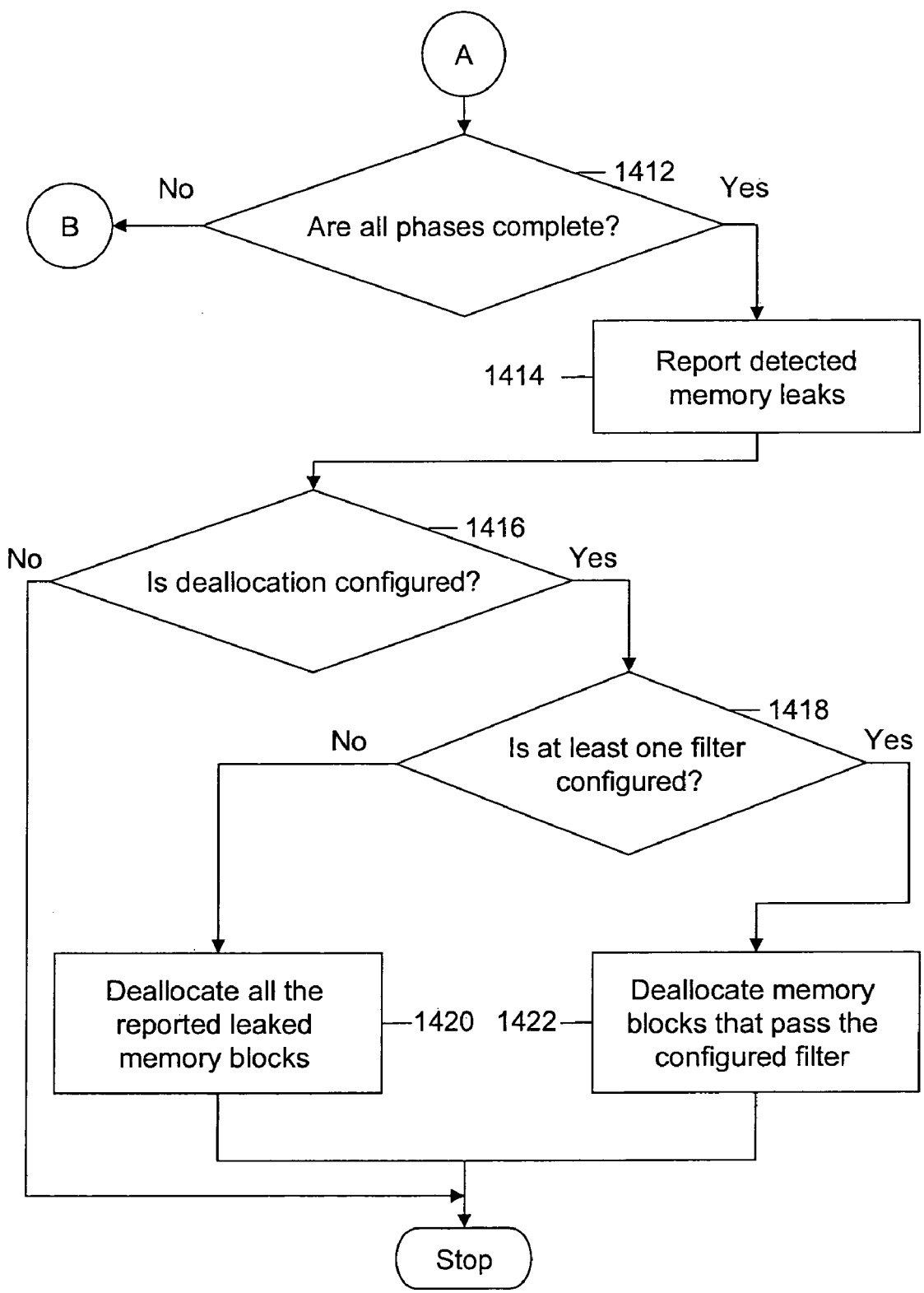

FIG. 14 is a flowchart illustrating an exemplary method for detecting and deallocating memory leaks, in accordance with various embodiments of the invention. At step 1402, the process for detecting and deallocating the memory leaks is triggered. As described earlier, the trigger may be a CLI. The process may be triggered if the unallocated memory blocks reach a predetermined or a user determined limit. At step 1404, potential memory leaks are identified, as described earlier with reference to FIG. 10. Then preparation for the next phase, i.e., validation phase is performed. Accordingly, the first stack may be modified for the next phase, as is described earlier, with reference to the description of the method for performing a validation phase. Therefore, at step

1406, the roots in the first stack are expanded. This expansion occurs as new memory blocks are found to be alive and are moved from the second stack to the first stack. The first stack is larger than the one used in the earlier phase because of root expansion. Root expansion means that for every successive phase, the memory blocks that were scanned in a previous phase, along with the memory blocks that were found to be live in an earlier phase are included in the first stack. In addition, at step 1408, the order of memory blocks in first stack is varied. Further, at step 1410, a random amount of delay is introduced before starting the next phase.

At step 1412, it is checked if all the validation phases to be performed are complete, i.e., the last validation phase is complete. If all the phases have not been performed, then the next validation phase is performed as described with reference to the method of performing the validation phases. If at step 1412 it is found that the last validation phase is complete, then at step 1414 the detected memory leaks are reported.

At step 1416, it is checked if deallocation has been configured. If the deallocation has been configured, then at step 1418 it is checked whether at least one filter has been configured. If no filter has been configured, then at step 1420 all the detected leaked memory blocks are deallocated. However, if it is found that at least one filter has been configured then, the configured filter (s) is applied to the detected leaked memory blocks. At step 1422, the detected leaked memory blocks that pass the configured filter (s) and qualify for deallocation are deallocated.

Various embodiments of the invention are designed to avoid the race condition and minimize its impacts including reducing the false alarms produced. A race condition occurs when a pointer is moved from un-scanned memory to scanned memory at each validation phase. In accordance with various embodiments of the invention, the occurrence of a race condition is avoided during the validation phases for memory leak detection and deallocation. The race condition is avoided by scanning all the memory blocks determined as alive in the previous scan, by including these in the first stack, thereby making the next validation phase give preference to scanning the memory blocks newly discovered as alive during that phase. The various embodiments of the present invention avoid the race condition by varying the order in which the memory blocks are pushed into the first stack for each validation phase. In accordance with various embodiments, the race condition is avoided by waiting for a random amount of time or randomly varying amount of time before performing a validation phase. Therefore, as described, the race condition is avoided by performing successive validation phases, shuffling the order in which memory blocks are pushed, and introducing a random delay in performing each validation phase. Further, the race condition and false alarms are reduced as all the memory blocks that are detected as alive in a preceding phase along with all the root blocks of the preceding phase are included in the first stack to be scanned for pointers, i.e., they are treated as roots, for the following validation phase.

The present invention has the advantage that the number of false alarms, i.e., identifying live memory blocks as memory leaks, generated is less. As described earlier, the false alarms are reduced due to the method of performing the validation phases to validate the potential memory leaks.

Further, various embodiments of the invention provide methods and systems for detecting and deallocating memory leaks in a system where the freezing or pausing of other tasks or programs can degrade the performance of the system or cause it to crash. Therefore, the methods and systems provided by various embodiments of the invention can be implemented to detect and deallocate memory leaks in an OS, i.e., kernel mode memory leaks and leak detection for embedded/real time systems.

Various embodiments of the invention can also be implemented without the hardware to support virtual memory. Additionally, various embodiments of the invention allow deallocation of the validated leaked memory.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   selecting a first allocated memory block from a plurality of allocated memory blocks, wherein the first allocated memory block includes a first allocated memory block address;
   searching other allocated memory blocks of the plurality of allocated memory blocks for a reference to the first allocated memory block;
   identifying that the first allocated memory block is a potential memory leak when the reference to the first allocated memory block is not found in the other allocated memory blocks of the plurality of allocated memory blocks;
   validating that the first allocated memory block is a memory leak using a plurality of successive validation phases in response to the first allocated memory block being identified as a potential memory leak, wherein each validation phase in the plurality of successive validation phases tests whether the first allocated memory block is a memory leak;
   not reporting the allocated memory block as a memory leak when the first allocated memory block is not validated after the plurality of successive validation phases even though the first allocated memory block was identified as a potential memory leak; and
   reporting the first allocated memory block as a memory leak when the validating confirms that the first allocated memory block is a memory leak.

2. The method of claim 1 wherein each of the plurality of allocated memory blocks includes a header portion and wherein the searching other allocated memory blocks of the plurality of allocated memory blocks further comprises:

searching the header portions of the other allocated memory blocks of the plurality of allocated memory blocks for a reference to the first allocated memory block.

3. The method of claim 1 further comprising:
examining a reference counter corresponding to the first allocated memory block.

4. The method of claim 1 wherein the verifying that the first allocated memory block is a memory leak further comprises:
determining whether the first allocated memory block has been deallocated.

5. The method of claim 1 further comprising:
searching the first allocated memory block for a reference to at least one of the plurality allocated memory blocks; and
storing the first allocated memory block address in a contingency chain corresponding to the at least one of the plurality allocated memory blocks when a reference to the at least one of the plurality allocated memory blocks is found in the first allocated memory block.

6. The method of claim 1 further comprising:
examining a contingency chain corresponding to one of the plurality of allocated memory blocks to determine whether any of the plurality of allocated memory blocks references the one of the plurality of allocated memory.

7. The method of claim 1 further comprising: forming a contingency chain for each of the plurality of allocated memory blocks, wherein each contingency chain is indexed by an allocated memory block address of the corresponding each of the plurality of allocated memory blocks.

8. A system comprising:
a memory;
a processor coupled to the memory; and
a memory leak detection system (MLDS) engine, wherein at least a portion of the MLDS engine is encoded as instructions stored in the memory and executable on the processor, and wherein the MLDS engine is configured to:
select a first allocated memory block from a plurality of allocated memory blocks stored in the memory, wherein the first allocated memory block includes a first allocated memory block address;
search other allocated memory blocks of the plurality of allocated memory blocks for a reference to the first allocated memory block;
identify that the first allocated memory block is a potential memory leak when the reference to the first allocated memory block is not found in the other allocated memory blocks of the plurality of allocated memory blocks;
validate that the first allocated memory block is a memory leak using a plurality of successive validation phases in response to the first allocated memory block being identified as a potential memory leak, wherein each validation phase in the plurality of successive validation phases tests whether the first allocated memory block is a memory leak;
not report the first allocated memory block as a memory leak when the first allocated memory block is not validated after the plurality of successive validation phases even though the first allocated memory block was identified as a potential memory leak; and
report the first allocated memory block as a memory leak when the validation confirms that the first allocated memory block is a memory leak.

9. The system of claim 8 further comprising at least of an MLDS data structure application programming interface (API), an MLDS command API, an MLDS data structure, and a command line interface (CLI) parser stored in at least one of the memory and a storage device accessible by the processor.

10. The system of claim 8 wherein the MLDS engine is further configured to:
select the first allocated memory block address from operating system memory management information.

11. The system of claim 8 wherein each of the plurality of allocated memory blocks includes a header portion, and wherein the MLDS engine is further configured to:
search the header portions of the other allocated memory blocks of the plurality of allocated memory blocks for a reference to the first allocated memory block.

12. The system of claim 8 wherein the MLDS engine is further configured to
determine whether the first allocated memory block has been deallocated.

13. The system of claim 8 wherein the first allocated memory block includes a header portion, and wherein the MLDS engine is further configured to:
examine the header portion of the first allocated memory block.

14. The system of claim 8 wherein the MLDS engine is further configured to:
form a contingency chain for each of the plurality of allocated memory blocks, wherein each contingency chain is indexed by an allocated memory block address of the corresponding each of the plurality of allocated memory blocks.

15. A computer readable storage medium comprising program instructions executable on a processor, wherein the program instructions are operable to implement each of:
selecting a first allocated memory block from a plurality of allocated memory blocks, wherein the first allocated memory block includes a first allocated memory block address;
searching other allocated memory blocks of the plurality of allocated memory blocks for a reference to the first allocated memory block;
identifying that the first allocated memory block is a potential memory leak when the reference to the first allocated memory block is not found in the other allocated memory blocks of the plurality of allocated memory blocks;
validating that the first allocated memory block is a memory leak using a plurality of successive validation phases in response to the first allocated memory block being identified as a potential memory leak, wherein each validation phase in the plurality of successive validation phases tests whether the first allocated memory block is a memory leak;
not reporting the first allocated memory block as a memory leak when the first allocated memory block is not validated after the plurality of successive validation phases even though the first allocated memory block was identified as a potential memory leak; and
reporting the first allocated memory block as a memory leak when the validating confirms that the first allocated memory block is a memory leak.

16. The computer readable storage medium of claim 15 wherein the selecting the first allocated memory block from the plurality of allocated memory blocks further comprises:
selecting the first allocated memory block address from operating system memory management information.

17. The computer readable storage medium of claim 15 wherein each of the plurality of allocated memory blocks includes a header portion, and wherein the searching other allocated memory blocks of the plurality of allocated memory blocks further comprises:
    searching the header portions of the other allocated memory blocks of the plurality of allocated memory blocks for a reference to the first allocated memory block.

18. The computer readable medium of claim 15 wherein the searching other allocated memory blocks of the plurality of allocated memory blocks further comprises:
    searching for an occurrence of the first allocated memory block address in the other allocated memory blocks of the plurality of allocated memory blocks.

19. The computer readable storage medium of claim 15 further comprising program instructions are operable to implement:
    examining a reference counter corresponding to the first allocated memory block.

20. The computer readable storage medium of claim 15 wherein the verifying that the first allocated memory block is a memory leak further comprises:
    determining whether the first allocated memory block has been deallocated.

21. The computer readable storage medium of claim 15 wherein the first allocated memory block includes a header portion, and wherein the verifying that the first allocated memory block is a memory leak further comprises:
    examining the header portion of the first allocated memory block.

22. The computer readable storage medium of claim 15 wherein the verifying that the first allocated memory block is a memory leak further comprises:
    examining free block memory management information maintained by an operating system.

23. The computer readable storage medium of claim 15 wherein the reporting the first allocated memory block as a memory leak farther comprises:
    displaying to a user at least one of: a program counter value, a process identification value, a process name, an initial block count, a previous block count, a current block count, a linearity value, the first allocated memory block address, and contents of the first allocated memory block.

24. The computer readable storage medium of claim 15 wherein the reporting the first allocated memory block as a memory leak farther comprises:
    storing in a data structure at least one of: a program counter value, a process identification value, a process name, an initial block count, a previous block count, a current block count, a linearity value, the first allocated memory block address, and contents of the first allocated memory block.

25. The computer readable storage medium of claim 15 further comprising program instructions are operable to implement each of:
    searching the first allocated memory block for a reference to at least one of the plurality allocated memory blocks; and
    storing the first allocated memory block address in a contingency chain corresponding to the at least one of the plurality allocated memory blocks when a reference to the at least one of the plurality allocated memory blocks is found in the first allocated memory block.

26. The computer readable storage medium of claim 15 further comprising program instructions are operable to implement each of:
    examining a contingency chain corresponding to one of the plurality of allocated memory blocks to determine whether any of the plurality of allocated memory blocks references the one of the plurality of allocated memory.

27. The computer readable storage medium of claim 15 further comprising program instructions are operable to implement:
    forming a contingency chain for each of the plurality of allocated memory blocks, wherein each contingency chain is indexed by an allocated memory block address of the corresponding each of the plurality of allocated memory blocks.

28. An apparatus comprising:
    a means for selecting a first allocated memory block from a plurality of allocated memory blocks, wherein the first allocated memory block includes a first allocated memory block address;
    a means for searching other allocated memory blocks of the plurality of allocated memory blocks for a reference to the first allocated memory block;
    a means for identifying that the first allocated memory block is a potential memory leak when the reference to the first allocated memory block is not found in the other allocated memory blocks of the plurality of allocated memory blocks;
    a means for validating that the first allocated memory block is a memory leak using a plurality of successive validation phases in response to the first allocated memory block being identified as a potential memory leak, wherein each validation phase in the plurality of successive validation phases tests whether the first allocated memory block is a memory leak; and
    a means for not reporting the first allocated memory block as a memory leak when the first allocated memory block is not validated after the plurality of successive validation phases even though the first allocated memory block was identified as a potential memory leak; and
    a means for reporting the first allocated memory block as a memory leak when the validating confirms that the first allocated memory block is a memory leak.

29. The apparatus of claim 28 wherein each of the plurality of allocated memory blocks includes a header portion, and wherein the apparatus further comprises:
    a means for searching the header portions of the other allocated memory blocks of the plurality of allocated memory blocks for a reference to the first allocated memory block.

30. The apparatus of claim 28 further comprising:
    a means for searching for an occurrence of the first allocated memory block address in the other allocated memory blocks of the plurality of allocated memory blocks.

31. The apparatus of claim 28 further comprising:
    a means for displaying to a user at least one of: a program counter value, a process identification value, a process name, an initial block count, a previous block count, a current block count, a linearity value, the first allocated memory block address, and contents of the first allocated memory block.

32. The apparatus of claim 28 further comprising:
    a means for searching the first allocated memory block for a reference to at least one of the plurality allocated memory blocks; and a means for storing the first allocated memory block address in a contingency chain corresponding to the at least one of the plurality allocated memory blocks when a reference to the at least one of the plurality allocated memory blocks is found in the first allocated memory block.

33. The apparatus of claim 28 further comprising:
a means for examining a contingency chain corresponding to one of the plurality of allocated memory blocks to determine whether any of the plurality of allocated memory blocks references the one of the plurality of allocated memory.

34. The apparatus of claim 28 further comprising:
a means for forming a contingency chain for each of the plurality of allocated memory blocks, wherein each contingency chain is indexed by an allocated memory block address of the corresponding each of the plurality of allocated memory blocks.

35. A method for detecting memory leaks in a system, the method comprising
performing a detection phase comprising
generating a first stack comprising a plurality of memory blocks that comprise roots;
generating a second stack comprising a plurality of memory blocks that are allocated memory blocks;
popping a memory block out of the first stack;
scanning the popped memory block for pointers to the memory blocks in the second stack;
if such a pointer is found:
updating the scanned memory block with the address of where the pointer is found;
pushing the updated memory block into the first stack;
removing the memory block that is referenced by the pointer from the second stack;
scanning the removed memory block, wherein the scanning is performed in accordance with the above mentioned steps;
repeating the popping, scanning, pushing and removing till the first stack is empty;
identifying the memory blocks as potential memory leaks, if the memory blocks remain in the second stack when the first stack is empty; and
performing at least one validation phase for validating the potential memory leaks to determine if the potential memory leaks are validated as memory leaks, wherein the at least one validation phase tests whether identified allocated memory blocks are memory leaks after identification as a potential memory leak;
not reporting identified allocated memory blocks as memory leaks when the memory blocks are not validated after the at least one validation phase even though the memory blocks were identified as potential memory leaks; and
reporting allocated memory blocks as memory leaks when the validation confirms that the memory blocks are memory leaks.

36. The method according to claim 35, wherein performing the validation phase comprises
populating the empty first stack, the populated first stack comprising memory blocks, the memory blocks being the root blocks of the detection phase or an earlier validation phase, all the memory blocks that were scanned in the detection phase or in an earlier validation phase and all the memory blocks to which at least one pointer was found in the detection phase or in an earlier validation phase, thereby the roots in the first stack are expanded;
popping out a memory block of the populated first stack;
scanning the popped memory block for pointers to the allocated memory blocks in the second stack;
if such a pointer is found:
updating the scanned memory block with the address of where the pointer is found;
pushing the updated memory block into the first stack;
removing the memory block that is referenced by the pointer from the second stack;
scanning the removed memory block, wherein the scanning is performed in accordance with the above mentioned steps;
repeating the popping, scanning, updating, pushing and removing till the populated first stack is empty;
identifying the memory blocks as potential memory leaks, if the memory blocks remain in the second stack when the modified first stack is empty.

37. The method according to claim 35 wherein the populating the first stack further comprises varying the order in which the memory blocks are pushed in the first stack for each validation phase.

38. The method according to claim 35 wherein each validation phase is performed after waiting for a random interval of time.

39. The method according to claim 35 wherein performing the at least one validation phase comprises performing a plurality of validation phases, wherein each validation phase in the plurality of validation phases tests whether the first allocated memory block is a memory leak.

40. The method according to claim 35 wherein a number of validation phases in the at least one validation phase is determined based on the dynamicity of the system for which the memory leaks are to be detected.

41. The method according to claim 35 wherein the validation of the potential memory leaks is stopped when a predetermined number of successive validation phases yield the same potential memory leaks.

42. The method according to claim 35 wherein identifying the validated potential memory leaks as memory leaks comprises identifying the allocated memory blocks remaining in the second stack for the last validation phase as the memory leaks if the first stack is empty.

43. The method according to claim 35 further comprising reporting the memory leaks.

44. The method according to claim 35 further comprising
setting a priority to the memory leak detection in an execution queue in a kernel; and
scheduling the execution of the memory leak detection based on at least one of the priority given to the memory leak detection, response to command line invocation by a user and the available unallocated memory blocks.

45. The method according to claim 35 wherein the memory leak detection is interrupted to execute a higher priority program.

46. The method according to claim 35 wherein the execution of the memory leak detection is scheduled when the amount of available unallocated memory blocks is less than a predetermined limit.

47. A method for deallocating memory leaks in a system, the method comprising
generating a first stack comprising a plurality of memory blocks that comprise roots;
generating a second stack comprising a plurality of memory blocks that are allocated;
scanning the memory blocks for pointers that reference the memory blocks in the second stack, the memory blocks including the memory blocks in the first stack and the memory blocks that are referenced by the pointers found in scanned memory blocks;

identifying potential memory leaks, potential memory leaks being the memory blocks in the second stack that are not referenced by the pointers in the scanned memory blocks;

performing at least one validation phase for validating the determined potential memory leaks to determine if the potential memory leaks are validated as memory leaks, wherein the at least one validation phase tests whether the identified allocated memory blocks are memory leaks;

not reporting identified allocated memory leaks when the memory blocks are not validated after the at least one validation phase even though the memory blocks were identified as potential memory leaks; and reporting identified allocated memory blocks as memory leaks when the validating confirms that the memory blocks are memory leaks if at least one filter is configured for deallocation,
applying the filter to the validated memory leaks for reclaiming the validated leaked memory; and
reclaiming the memory leaks that are allowed by the filter; else
reclaiming all the validated memory leaks.

48. The method according to claim 47 wherein the scanning of memory blocks for pointers further comprises
popping out a memory block of the first stack;
scanning the popped memory block for pointers to memory blocks in the second stack;
if such a pointer is found:
updating the scanned memory block with the address of where the pointer is found;
pushing the updated memory block into the first stack;
removing the memory block that is referenced by the pointer from the second stack;
scanning the removed memory block, wherein the scanning is performed in accordance with the above mentioned steps;
repeating the popping, scanning, updating, pushing and removing till the populated first stack is empty.

49. The method according to claim 48, wherein the filter allows deallocating the memory leaks based on specific addresses of instructions that allocated the leaked memory blocks.

50. The method according to claim 48 wherein the performing the validation phases comprises
populating the first stack, the populated first stack comprising memory blocks, the memory blocks comprising the root blocks and the referenced memory blocks;
popping out a memory block of the first stack;
scanning the popped memory block for pointers to memory blocks in the second stack;
if such a pointer is found:
updating the scanned memory block with the address of where the pointer is found;
pushing the updated memory block into the first stack;
removing the memory block that is referenced by the pointer from the second stack;
scanning the removed memory block, wherein the scanning is performed in accordance with the above mentioned steps;
repeating the popping, scanning, updating, pushing and removing till the populated first stack is empty; and
if the first stack is empty:
identifying the allocated memory blocks remaining in the second stack as the potential leaked allocated memory blocks.

51. The method according to claim 48 wherein the performing the validation phases comprises shuffling the order of the referenced memory blocks and root blocks in the first stack.

52. The method according to claim 48 wherein each validation phase is performed after waiting for a random amount of time.

53. The method according to claim 48 wherein the potential memory leaks identified after the last validation phase comprise the memory leaks.

54. The method according to claim 48 further comprising scheduling the deallocation of leaked memory blocks if the amount of free memory blocks in the system falls below a predetermined limit.

55. The method according to claim 48 further comprising scheduling the deallocation of the leaked memory blocks, if a user initiates the deallocation using a Command Line Invocation.

56. A method for detecting memory leaks in a system, the method comprising
performing a detection phase comprising
generating a first stack comprising a plurality of memory blocks that comprise roots;
generating a second stack comprising a plurality of memory blocks that are allocated memory blocks;
popping a memory block out of the first stack;
scanning the memory block for pointers to the memory blocks in the second stack;
each time such a pointer is found:
removing the memory block that is referenced by the pointer;
pushing the removed memory block into the first stack; repeating the popping, scanning, removing and pushing till the first stack is empty;
identifying the allocated memory blocks as potential memory leaks, if the allocated memory blocks remain in the second stack when the first stack is empty;
performing at least one validation phase for validating the potential memory leaks to determine if the potential memory leaks are validated as memory leaks, wherein the at least one validation phase tests whether the identified allocated memory blocks are memory leaks;
not reporting identified allocated memory leaks when the memory blocks are not validated after the at least one validation phase even though the memory blocks were identified as potential memory leaks; and
reporting identified allocated memory blocks as memory leaks when the validating confirms that the memory blocks are memory leaks.

57. A system for detecting memory leaks, the system comprising
a memory leak detector for detecting memory leaks, the memory leak detector comprising
a generating module, the generating module generating a first stack comprising a plurality of memory blocks that comprise roots and/or a plurality of allocated memory blocks and generating a second stack comprising a plurality of allocated memory blocks;
a scanning module, the scanning module capable of:
popping memory blocks out of the first stack;
scanning memory blocks for pointers to the allocated memory blocks in the second stack;

removing the allocated memory block that is referenced by the pointer, if such a pointer is found;
updating the memory block in which the pointer is found with the address of where the pointer is found;
pushing the updated memory block into the first stack;
popping, scanning, removing, updating and pushing till the first stack is empty;
identifying allocated memory blocks as potential memory leaks, if the allocated memory blocks remain in the second stack, when the first stack is empty;
performing at least one validation phase for validating the potential memory leaks to determine if the potential memory leaks are validated as memory leaks, wherein the at least one validation phase tests whether the first allocated memory block is a memory leak;
not reporting identified allocated memory blocks as memory leaks when the memory blocks are not validated after the at least one validation phase even though the memory blocks were identified as potential memory leaks; and
reporting identified allocated memory blocks as memory leaks when the validating confirms that the memory blocks are memory leaks.

58. The system according to claim 57, wherein the memory leak detector detects leaked allocated memory blocks in the Operating System.

59. The memory leak detector according to claim 57, wherein the leak detection is performed without the hardware to support virtual memory.

60. A system for detecting leaked allocated memory, the system comprising
means for performing a detection phase, the means for performing the detection phase comprising
means for generating a first stack comprising a plurality of memory blocks, the memory blocks comprising roots;
means for generating a second stack comprising a plurality of allocated memory blocks;
means for popping a memory block out of the first stack;
means for scanning the popped memory block for pointers to the allocated memory blocks in the second stack;
means for updating the scanned memory block with the address of where the pointer is found;
means for pushing the updated memory block into the first stack;
means for removing the allocated memory block that is referenced by the pointer from the second stack;
means for scanning the removed memory block;
means for identifying the allocated memory blocks as potential memory leaks;
means for performing at least one validation phase for validating the potential memory leaks to determine if the potential memory leaks are validated as memory leaks, wherein the at least one validation phase tests whether the allocated memory blocks are memory leaks;
means for not reporting identified allocated memory blocks as memory leaks when the memory blocks are not validated after the at least one validation phase even though the memory blocks were identified as potential memory leaks; and
means for reporting identified allocated memory blocks as memory leaks when the validating confirms that the memory blocks are memory leaks.

61. The system according to claim 60, wherein the system further comprises
means for selling a priority to the memory leak detection in an execution queue in a kernel; and
means for scheduling the execution of the memory leak detection based on at least one of the priority given to the memory leak detection, response to command line invocation by a user and the available unallocated memory blocks.

62. A machine-readable storage medium having stored thereon instructions for detecting leaked memory blocks, the instructions comprising instructions for
performing a detection phase, the instructions for performing the detection phase comprising one or more instructions for
generating a first stack comprising a plurality of memory blocks that comprise roots;
generating a second stack comprising a plurality of allocated memory blocks;
popping a memory block out of the first stack;
scanning the popped memory block for pointers to the allocated memory blocks in the second stack;
if such a pointer is found:
updating the scanned memory block with the address of where the pointer is found;
pushing the updated memory block into the first stack;
removing the memory block that is referenced by the pointer from the second stack;
scanning the removed memory block, wherein the scanning is performed in accordance with the above mentioned steps;
repeating the popping, scanning, updating, pushing and removing till the populated first stack is empty;
identifying the allocated memory blocks as potential memory leaks, if the allocated memory blocks remain in the second stack when the first stack is empty; and
one or more instructions for performing at least one validation phase for validating the potential memory leaks to determine if the potential memory leaks are validated as memory leaks, wherein the at least one validation phase tests whether the identified allocated memory blocks are memory leaks;
one or more instructions for not reporting identified allocated memory blocks as memory leaks when the memory blocks are not validated after the at least one validation phase even though the memory blocks were identified as potential memory leaks; and
one or more instructions for reporting identified allocated memory blocks as memory leaks when the validating confirms that the memory blocks are memory leaks.

63. The machine-readable storage medium according to claim 62, wherein the stored instructions further comprises one or more instructions for configuring filters to deallocate selective leaked memory blocks.

64. An apparatus for memory leak detection comprising
a processing system including a processor coupled to a display and user input device;
a machine-readable medium including instructions executable by the processor comprising
one or more instructions for detecting leaked memory blocks, the instructions comprising instructions for
performing a detection phase, the instruction for performing the detection phase comprising one or more instructions for
generating a first stack comprising a plurality of memory blocks that comprise roots;
generating a second stack comprising a plurality of allocated memory blocks;
popping a memory block out of the first stack;
scanning the popped memory block for pointers to the allocated memory blocks in the second stack;

if such a pointer is found:
: updating the scanned memory block with the address of where the pointer is found;
: pushing the updated memory block into the first stack;
: removing the memory block that is referenced by the pointer from the second stack;
: scanning the removed memory block, wherein the scanning is performed in accordance with the above mentioned steps;

repeating the popping, scanning, updating, pushing and removing till the populated first stack is empty;

identifying the allocated memory blocks as potential memory leaks, if the allocated memory blocks remain in the second stack when the first stack is empty;

one or more instructions for performing at least one validation phase for validating the potential memory leaks to determine if the potential memory leaks are validated as memory leaks, wherein the at least one validation phase tests whether the identified allocated memory blocks are memory leaks;

one or more instructions for not reporting identified allocated memory blocks as memory leaks when the memory blocks are not validated after the at least one validation phase even though the memory blocks were identified as potential memory leaks; and one or more instructions for reporting identified allocated memory blocks as memory leaks when the validating confirms that the memory leaks.

* * * * *